US012621853B2

(12) United States Patent
Tuong Tran et al.

(10) Patent No.: US 12,621,853 B2
(45) Date of Patent: May 5, 2026

(54) CONTROL RESOURCE SET ZERO FOR REDUCED CAPABILITY NEW RADIO DEVICES

(71) Applicant: Panasonic Intellectual Property Corporation of America, Torrance, CA (US)

(72) Inventors: Xuan Tuong Tran, Singapore (SG); Akihiko Nishio, Osaka (JP); Shotaro Maki, Kanagawa (JP); Hidetoshi Suzuki, Kanagawa (JP); Quan Kuang, Langen (DE); Hongchao Li, Langen (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 789 days.

(21) Appl. No.: 17/918,313

(22) PCT Filed: Feb. 18, 2021

(86) PCT No.: PCT/SG2021/050080
§ 371 (c)(1),
(2) Date: Oct. 11, 2022

(87) PCT Pub. No.: WO2021/211055
PCT Pub. Date: Oct. 21, 2021

(65) Prior Publication Data
US 2023/0156752 A1     May 18, 2023

(30) Foreign Application Priority Data

Apr. 17, 2020    (SG) ............................ 10202003546X

(51) Int. Cl.
| | |
|---|---|
| *H04W 72/51* | (2023.01) |
| *H04W 24/08* | (2009.01) |
| *H04W 72/1273* | (2023.01) |

(52) U.S. Cl.
CPC ........... *H04W 72/51* (2023.01); *H04W 24/08* (2013.01); *H04W 72/1273* (2013.01)

(58) Field of Classification Search
None
See application file for complete search history.

(56) References Cited

U.S. PATENT DOCUMENTS

| | | | |
|---|---|---|---|
| 2020/0092799 A1 | 3/2020 | Xu et al. | |
| 2020/0120584 A1 | 4/2020 | Yi et al. | |

(Continued)

FOREIGN PATENT DOCUMENTS

| | | |
|---|---|---|
| CN | 110475361 A | 11/2019 |
| CN | 110505642 A | 11/2019 |

(Continued)

OTHER PUBLICATIONS

3GPP, "3rd Generation Partnership Project; Technical Specification Group Radio Access Network; NR; NR and NG-RAN Overall Description; Stage 2 (Release 15)," 3GPP TS 38.300 V15.6.0, Jun. 2019. (99 pages).

(Continued)

*Primary Examiner* — Anh Ngoc M Nguyen
(74) *Attorney, Agent, or Firm* — Seed Intellectual Property Law Group LLP

(57) ABSTRACT

The present disclosure provides communication apparatuses and communication methods for implementation of Control Resource Set Zero (CORESET #0) for Reduced Capability (RedCap) New Radio Devices. The communication apparatuses include a communication apparatus which comprises a receiver, which in operation, receives a physical downlink (Continued)

control channel (PDCCH) on a control resource set zero (CORESET #0) of which time and frequency resources are defined based on a bandwidth configuration of reduced capacity user equipments (RedCap UEs), and receives a system information block type 1 (SIB1) physical downlink shared channel (PDSCH) which is scheduled based on the CORESET #0; and circuitry, which in operation, determines control information and parameters from the PDCCH on CORESET #0 to read SIB1 for initial access, handover, or beam failure recovery.

11 Claims, 30 Drawing Sheets

(56) References Cited

U.S. PATENT DOCUMENTS

| | | | |
|---|---|---|---|
| 2021/0227558 A1 | 7/2021 | Matsumura et al. | |
| 2022/0321311 A1 | 10/2022 | Zhou et al. | |
| 2022/0330242 A1 | 10/2022 | Zhou et al. | |
| 2022/0394601 A1* | 12/2022 | Zhang | H04L 1/1893 |

FOREIGN PATENT DOCUMENTS

| | | |
|---|---|---|
| CN | 110602731 A | 12/2019 |
| EP | 4033798 A1 | 7/2022 |
| WO | 2018229736 A1 | 12/2018 |
| WO | 2019164302 A1 | 8/2019 |
| WO | 2020029746 A1 | 2/2020 |
| WO | 2020039481 A1 | 2/2020 |

OTHER PUBLICATIONS

3GPP, "3rd Generation Partnership Project; Technical Specification Group Radio Access Network; NR; Physical channels and modulation (Release 15)," 3GPP TS 38.211 V15.6.0, Jun. 2019. (97 pages).

3Gpp, "3rd Generation Partnership Project; Technical Specification Group Radio Access Network; NR; Physical layer procedures for control (Release 16)," 3GPP TS 38.213 V16.1.0, Mar. 2020. (156 pages).

3GPP, "3rd Generation Partnership Project; Technical Specification Group Radio Access Network; Study on Scenarios and Requirements for Next Generation Technologies; (Release 15)," 3GPP TR 38.913 V15.0.0, Jun. 2018. (39 pages).

3GPP, "3rd Generation Partnership Project; Technical Specification Group Services and System Aspects; System Architecture for the 5G System; Stage 2 (Release 16)," 3GPP TS 23.501 V16.1.0, Jun. 2019. (368 pages).

Ericsson, "New SID on support of reduced capability NR devices," RP-193238, Agenda Item: 9.1.1, 3GPP TSG RAN Meeting #86, Sitges, Spain, Dec. 9-12, 2019. (5 pages).

International Search Report, mailed Jun. 4, 2021, for International Patent Application No. PCT/SG2021/050080. (4 pages).

International Telecommunication Union, "IMT Vision—Framework and overall objectives of the future development of IMT for 2020 and beyond," ITU-R: Radiocommunication Sector of ITU, M Series: Mobile, radiodetermination, amateur and related satellite services, Recommendation ITU-R M.2083-0, Sep. 2015. (21 pages).

Qualcomm, "NR-Lite for Rel-17 Qualcomm views," RP-190844, 3GPP RAN #84, Newport Beach, Jun. 3-6, 2019. (11 pages).

Extended European Search Report, dated Sep. 26, 2023, for European Patent Application No. 21935428.9-1213. (11 pages).

Extended European Search Report, dated Sep. 16, 2025, for European Patent Application No. 25194020.1. (13 pages).

Office Action, mailed Feb. 27, 2026, for Indian Patent Application No. 202247056795. (8 pages)(with translation).

* cited by examiner

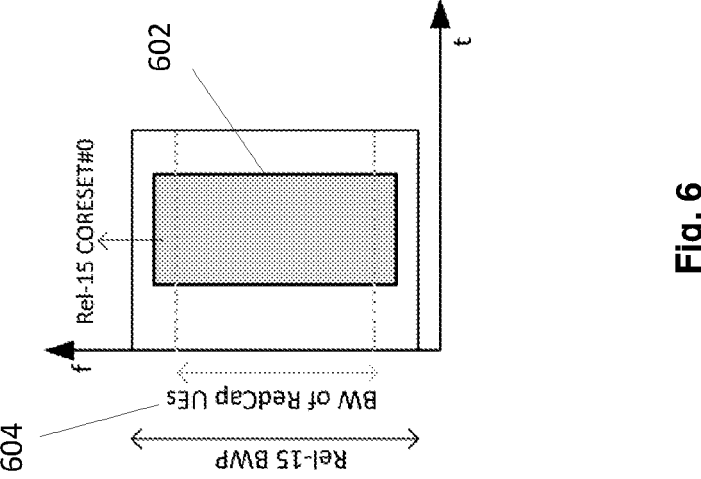
Fig. 6

| Index | SSB and CORESET multiplexing pattern | Number of RBs $N_{RB}^{CORESET}$ | Number of Symbols $N_{symb}^{CORESET}$ | Offset (RBs) |
|---|---|---|---|---|
| 0 | 1 | 24 | 2 | 0 |
| 1 | 1 | 24 | 2 | 2 |
| 2 | 1 | 24 | 2 | 4 |
| 3 | 1 | 24 | 3 | 0 |
| 4 | 1 | 24 | 3 | 2 |
| 5 | 1 | 24 | 3 | 4 |
| 6 | Reserved | | | |
| 7 | Reserved | | | |
| 8 | Reserved | | | |
| 9 | Reserved | | | |
| 10 | Reserved | | | |
| 11 | Reserved | | | |
| 12 | Reserved | | | |
| 13 | Reserved | | | |
| 14 | Reserved | | | |
| 15 | Reserved | | | |

| Index | SSB and CORESET multiplexing pattern | Number of RBs $N_{RB}^{CORESET}$ | Number of Symbols $N_{symb}^{CORESET}$ | Offset (RBs) |
|---|---|---|---|---|
| 0 | 1 | 24 | 2 | 0 |
| 1 | 1 | 24 | 2 | 2 |
| 2 | 1 | 24 | 2 | 4 |
| 3 | 1 | 24 | 3 | 0 |
| 4 | 1 | 24 | 3 | 2 |
| 5 | 1 | 24 | 3 | 4 |
| 6 | 1 | 48 | 1 | 12 |
| 7 | 1 | 48 | 1 | 16 |
| 8 | 1 | 48 | 2 | 12 |
| 9 | 1 | 48 | 2 | 16 |
| 10 | 1 | 48 | 3 | 12 |
| 11 | 1 | 48 | 3 | 16 |
| 12 | Reserved | | | |
| 13 | Reserved | | | |
| 14 | Reserved | | | |
| 15 | Reserved | | | |

| Index | For normal UEs | | | | For RedCap UEs | | |
|---|---|---|---|---|---|---|---|
| | SS/PBCH block and CORESET multiplexing pattern | Number of RBs $N_{RB}^{CORESET}$ | Number of Symbols $N_{symb}^{CORESET}$ | Offset (RBs) | Number of RBs $N_{RB}^{CORESET}$ | Number of Symbols $N_{symb}^{CORESET}$ | Offset (RBs) |
| 0 | 1 | 24 | 2 | 0 | 24 | 2 | 0 |
| 1 | 1 | 24 | 2 | 2 | 24 | 2 | 2 |
| 2 | 1 | 24 | 2 | 4 | 24 | 2 | 4 |
| 3 | 1 | 24 | 3 | 0 | 24 | 3 | 0 |
| 4 | 1 | 24 | 3 | 2 | 24 | 3 | 2 |
| 5 | 1 | 24 | 3 | 4 | 24 | 3 | 4 |
| 6 | 1 | 48 | 1 | 12 | 24 | 1 | 0 |
| 7 | 1 | 48 | 1 | 16 | 24 | 1 | 2 |
| 8 | 1 | 48 | 2 | 12 | 24 | 2 | 0 |
| 9 | 1 | 48 | 2 | 16 | 24 | 2 | 2 |
| 10 | 1 | 48 | 3 | 12 | 24 | 3 | 0 |
| 11 | 1 | 48 | 3 | 16 | 24 | 3 | 2 |
| 12 | 1 | 96 | 1 | 38 | 24 | 1 | 0 |
| 13 | 1 | 96 | 2 | 38 | 24 | 2 | 0 |
| 14 | 1 | 96 | 3 | 38 | 24 | 3 | 0 |
| 15 | Reserved | | | | | | |

1902　1904

1900

For RedCap UEs

| Index | SS/PBCH block and CORESET multiplexing pattern | Number of RBs $N_{RB}^{CORESET}$ | Number of Symbols $N_{Symb}^{CORESET}$ | Offset (RBs) |
|---|---|---|---|---|
| 0 | 1 | 24 | 2 | 0 |
| 1 | 1 | 24 | 2 | 2 |
| 2 | 1 | 24 | 2 | 4 |
| 3 | 1 | 24 | 3 | 0 |
| 4 | 1 | 24 | 3 | 2 |
| 5 | 1 | 24 | 3 | 4 |
| 6 | 1 | 24 | 1 | 0 |
| 7 | 1 | 24 | 1 | 2 |
| 8 | 1 | 24 | 2 | 0 |
| 9 | 1 | 24 | 2 | 2 |
| 10 | 1 | 24 | 3 | 0 |
| 11 | 1 | 24 | 3 | 2 |
| 12 | 1 | 24 | 1 | 0 |
| 13 | 1 | 24 | 2 | 0 |
| 14 | 1 | 24 | 3 | 0 |
| 15 | Reserved | | | |

| Index | $O$ | Number of SS sets per slot | $M$ | First symbol index | Index $p$ for RedCap UE CORESET#0 |
|---|---|---|---|---|---|
| 0 | 0 | 1 | 1 | 0 | 0 |
| 1 | 0 | 2 | 1/2 | {0, if $i$ is even}, {$N^{CORESET}_{symb}$, if $i$ is odd} | 0 |
| 2 | 2 | 1 | 1 | 0 | 1 |
| 3 | 2 | 2 | 1/2 | {0, if $i$ is even}, {$N^{CORESET}_{symb}$, if $i$ is odd} | 0 |
| 4 | 5 | 1 | 1 | 0 | 1 |
| 5 | 5 | 2 | 1/2 | {0, if $i$ is even}, {$N^{CORESET}_{symb}$, if $i$ is odd} | 0 |
| 6 | 7 | 1 | 1 | 0 | 0 |
| 7 | 7 | 2 | 1/2 | {0, if $i$ is even}, {$N^{CORESET}_{symb}$, if $i$ is odd} | 0 |
| 8 | 0 | 1 | 2 | 0 | 0 |
| 9 | 5 | 1 | 2 | 0 | 0 |
| 10 | 0 | 1 | 1 | 1 | 1 |
| 11 | 0 | 1 | 1 | 2 | 1 |
| 12 | 2 | 1 | 1 | 1 | 1 |
| 13 | 2 | 1 | 1 | 2 | 1 |
| 14 | 5 | 1 | 1 | 1 | 1 |
| 15 | 5 | 1 | 1 | 2 | 0 |

| Index | For normal UEs | | | | For RedCap UEs | | | |
|---|---|---|---|---|---|---|---|---|
| | SS/PBCH block and CORESET multiplexing pattern | Number of RBs $N_{RB}^{CORESET}$ | Number of Symbols $N_{symb}^{CORESET}$ | Offset (RBs) | Number of RBs $N_{RB}^{CORESET}$ | Number of Symbols $N_{symb}^{CORESET}$ | Offset (RBs) | Number of Repetitions |
| 0 | 1 | 24 | 2 | 0 | 24 | 2 | 0 | 1 |
| 1 | 1 | 24 | 2 | 2 | 24 | 2 | 2 | 2 |
| 2 | 1 | 24 | 2 | 4 | 24 | 2 | 4 | 1 |
| 3 | 1 | 24 | 3 | 0 | 24 | 3 | 0 | 2 |
| 4 | 1 | 24 | 3 | 2 | 24 | 3 | 2 | 1 |
| 5 | 1 | 24 | 3 | 4 | 24 | 3 | 4 | 2 |
| 6 | 1 | 48 | 1 | 12 | 24 | 1 | 0 | 1 |
| 7 | 1 | 48 | 1 | 16 | 24 | 1 | 2 | 2 |
| 8 | 1 | 48 | 2 | 12 | 24 | 2 | 0 | 4 |
| 9 | 1 | 48 | 2 | 16 | 24 | 2 | 2 | 4 |
| 10 | 1 | 48 | 3 | 12 | 24 | 3 | 0 | 2 |
| 11 | 1 | 48 | 3 | 16 | 24 | 3 | 2 | 2 |
| 12 | 1 | 96 | 1 | 38 | 24 | 1 | 0 | 2 |
| 13 | 1 | 96 | 2 | 38 | 24 | 2 | 0 | 2 |
| 14 | 1 | 96 | 3 | 38 | 24 | 3 | 0 | 2 |
| 15 | Reserved | | | | | | | |

| Index | $o$ | Number of SS sets per slot | $M$ | First symbol index | Number of Repetition for RedCap UE |
|---|---|---|---|---|---|
| 0 | 0 | 1 | 1 | 0 | 1 |
| 1 | 0 | 2 | 1/2 | $\{0, \text{if } i \text{ is even}\}, \{N^{CORESET}_{symb}, \text{if } i \text{ is odd}\}$ | 2 |
| 2 | 2 | 1 | 1 | 0 | 1 |
| 3 | 2 | 2 | 1/2 | $\{0, \text{if } i \text{ is even}\}, \{N^{CORESET}_{symb}, \text{if } i \text{ is odd}\}$ | 2 |
| 4 | 5 | 1 | 1 | 0 | 1 |
| 5 | 5 | 2 | 1/2 | $\{0, \text{if } i \text{ is even}\}, \{N^{CORESET}_{symb}, \text{if } i \text{ is odd}\}$ | 2 |
| 6 | 7 | 1 | 1 | 0 | 1 |
| 7 | 7 | 2 | 1/2 | $\{0, \text{if } i \text{ is even}\}, \{N^{CORESET}_{symb}, \text{if } i \text{ is odd}\}$ | 2 |
| 8 | 0 | 1 | 2 | 0 | 4 |
| 9 | 5 | 1 | 2 | 0 | 4 |
| 10 | 0 | 1 | 1 | 1 | 2 |
| 11 | 0 | 1 | 1 | 2 | 2 |
| 12 | 2 | 1 | 1 | 1 | 2 |
| 13 | 2 | 1 | 1 | 2 | 2 |
| 14 | 5 | 1 | 1 | 1 | 2 |
| 15 | 5 | 1 | 1 | 2 | 2 |

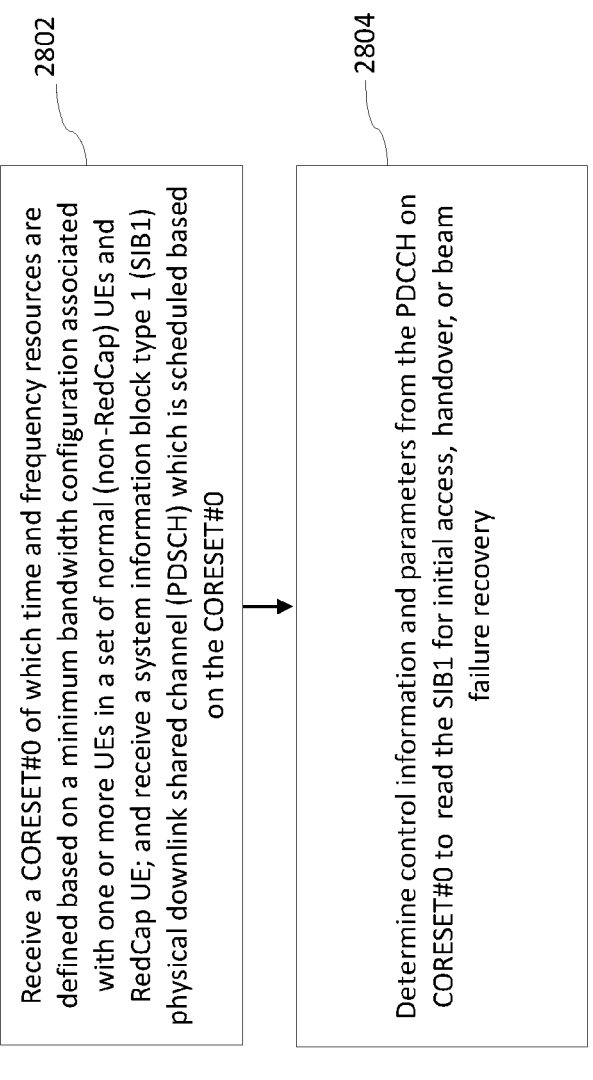

2802

Receive a CORESET#0 of which time and frequency resources are defined based on a minimum bandwidth configuration associated with one or more UEs in a set of normal (non-RedCap) UEs and RedCap UE; and receive a system information block type 1 (SIB1) physical downlink shared channel (PDSCH) which is scheduled based on the CORESET#0

2804

Determine control information and parameters from the PDCCH on CORESET#0 to read the SIB1 for initial access, handover, or beam failure recovery

CONTROL RESOURCE SET ZERO FOR REDUCED CAPABILITY NEW RADIO DEVICES

TECHNICAL FIELD

The following disclosure relates to communication apparatuses and communication methods for implementing Control Resource Set Zero (CORESET #0) for Reduced Capability (RedCap) Devices, in particular CORESET #0 for RedCap New Radio (NR) devices.

BACKGROUND

New Radio (NR) is a new radio air interface developed by the 3rd Generation Partnership Project (3GPP) for the fifth generation (5G) mobile communications system. With great flexibility, scalability, and efficiency, 5G is expected to address a wide range of use cases including enhanced mobile broadband (eMBB), ultra-reliable low-latency communications (URLLC), and massive machine type communications (mMTC).

One important objective of 5G is to enable connected industries. 5G connectivity can serve as catalyst for next wave of industrial transformation and digitalization, which improve flexibility, enhance productivity and efficiency, reduce maintenance cost, and improve operational safety. Devices in such environment may include for example pressure sensors, humidity sensors, thermometers, motion sensors, accelerometers, actuators, etc. It is desirable to connect these sensors and actuators to 5G networks.

5G connectivity can also serve as catalyst for the next wave smart city innovations. For instance, small devices including wearables such as smart watches, rings, eHealth related devices, medical monitoring devices, reduced capacity (RedCap) devices etc. will benefit from improvements in 5G connectivity.

However, there has been no discussion so far concerning CORESET #0 for RedCap devices.

There is thus a need for communication apparatuses and methods that can solve the above mentioned issue. Furthermore, other desirable features and characteristics will become apparent from the subsequent detailed description and the appended claims, taken in conjunction with the accompanying drawings and this background of the disclosure.

SUMMARY

One non-limiting and exemplary embodiment facilitates implementation of CORESET #0 for RedCap devices in 5G NR based communications.

In one aspect, the techniques disclosed herein provide a communication apparatus. For example, the communication apparatus can be a subscriber UE, which may be a normal (non-RedCap, or Rel-15/16/17, or later release) UE, a RedCap UE or other similar types of UE. The communication apparatus comprises a receiver, which in operation, receives a physical downlink control channel (PDCCH) on a control resource set zero (CORESET #0) of which time and frequency resources are defined based on a bandwidth configuration of reduced capability user equipments (RedCap UEs), and receives a system information block type 1 (SIB1) physical downlink shared channel (PDSCH) which is scheduled based on the CORESET #0; and circuitry, which in operation, determines control information and parameters from the PDCCH on CORESET #0 to read SIB1, message 2 (Msg2) PDSCH, as well as message 4 (Msg4) PDSCH for initial access, handover, or beam failure recovery.

In another aspect, the techniques disclosed herein provide a communication apparatus. For example, the communication apparatus can be a base station or gNodeB (gNB) which comprises circuitry, which in operation, configures a control resource set zero (CORESET #0) of which time and frequency resources are defined based on a minimum bandwidth configuration associated with one or more UEs in a set of normal (non-RedCap) UEs and the RedCap UEs, generates a physical downlink control channel (PDCCH) on the CORESET #0, and schedules a system information block type 1 (SIB1) physical downlink shared channel (PDSCH) based on the CORESET #0; and a transmitter, which in operation, transmits the PDCCH, the SIB1 PDSCH, Msg2 PDSCH, as well as Msg4 PDSCH on CORESET #0 to a communication apparatus.

In another aspect, the techniques disclosed herein provide a communication method. The communication method comprises receiving a CORESET #0 of which time and frequency resources are defined based on a minimum bandwidth configuration associated with one or more UEs in a set of normal (non-RedCap) UEs and RedCap UE, receiving a system information block type 1 (SIB1) physical downlink shared channel (PDSCH) which is scheduled based on the CORESET #0; and determining control information and parameters from the PDCCH on CORESET #0 to read the SIB1, Msg2 PDSCH, as well as Msg4 PDSCH for initial access, handover, or beam failure recovery.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

Embodiments of the disclosure will be better understood and readily apparent to one of ordinary skilled in the art from the following written description, by way of example only, and in conjunction with the drawings, in which:

FIG. 6 shows an example of a bandwidth comparison between a Rel-15 CORESET with index 0 (CORESET #0) and a RedCap UE.

FIG. 8A shows a table of subsets of Rel-15 CORESET #0 for RedCap UEs when bandwidth of the RedCap UE is 5 MHz and {synchronization signal block, physical downlink control channel} subcarrier spacing ({Synchronization signal block (SSB), PDCCH} SCS) is {15, 15} kHz in accordance with an embodiment 1.

FIG. 8B shows a table of subsets of Rel-15 CORESET #0 for RedCap UEs when bandwidth of the RedCap UE is 10 MHz and {SSB, PDCCH} SCS is {15, 15} kHz in accordance with embodiment 1.

FIG. 20 shows an example of an independent table comprising sets of resource blocks and slot symbols of CORESET for Type0-PDCCH search space set for RedCap UEs, when {SS/PBCH block, PDCCH} SCS is {15, 15} kHz for frequency bands with minimum channel bandwidth of 5 MHz in accordance with an embodiment 5A.

FIG. 23 shows a table of parameters for reinterpretation of PDCCH monitoring occasions for Type0-PDCCH CSS set—SSB and CORESET multiplexing pattern 1 and frequency range 1 (FR1), in accordance with an embodiment 5B.

FIG. 26 shows a table illustrating, for RedCap UEs, repetition and set of resource blocks and slot symbols of CORESET for Type0-PDCCH search space set when {SS/PBCH block, PDCCH} SCS is {15, 15} kHz for frequency bands with minimum channel BW 5 MHz or 10 MHz, in accordance with an embodiment 5C.

FIG. 27 shows a table comprising parameters for repetition and PDCCH monitoring occasions for Type0-PDCCH CSS set—SS/PBCH block and CORESET multiplexing pattern 1 and FR1, in accordance with an embodiment 5C.

FIG. 28 shows a flow diagram of a communication method for implementation of CORESET #0 for RedCap UEs in accordance with various embodiments.

Figure 1:
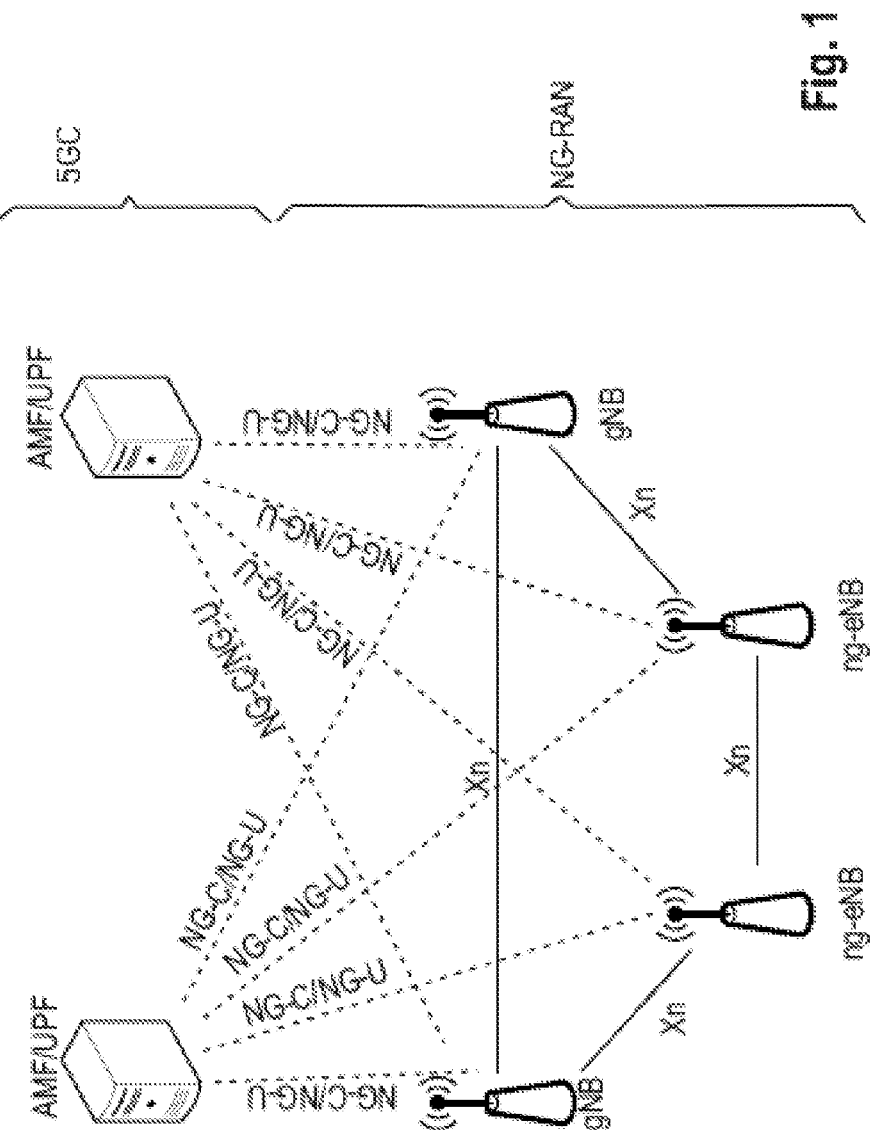
FIG. 1 shows an exemplary architecture for a 3GPP NR system.

Skilled artisans will appreciate that elements in the figures are illustrated for simplicity and clarity and have not necessarily been depicted to scale. For example, the dimensions of some of the elements in the illustrations, block diagrams or flowcharts may be exaggerated in respect to other elements to help to improve understanding of the present embodiments.

DETAILED DESCRIPTION

Some embodiments of the present disclosure will be described, by way of example only, with reference to the drawings. Like reference numerals and characters in the drawings refer to like elements or equivalents.

5G NR System Architecture and Protocol Stacks

3GPP has been working at the next release for the $5^{th}$ generation cellular technology, simply called 5G, including the development of a new radio access technology (NR) operating in frequencies ranging up to 100 GHz. The first version of the 5G standard was completed at the end of 2017, which allows proceeding to 5G NR standard-compliant trials and commercial deployments of smartphones.

Among other things, the overall system architecture assumes an NG-RAN (Next Generation—Radio Access Network) that comprises gNBs, providing the NG-radio access user plane (SDAP/PDCP/RLC/MAC/PHY) and control plane (RRC) protocol terminations towards the UE. The gNBs are interconnected with each other by means of the Xn interface. The gNBs are also connected by means of the Next Generation (NG) interface to the NGC (Next Generation Core), more specifically to the AMF (Access and Mobility Management Function) (e.g. a particular core entity performing the AMF) by means of the NG-C interface and to the UPF (User Plane Function) (e.g. a particular core entity performing the UPF) by means of the NG-U interface. The NG-RAN architecture is illustrated in FIG. 1 (see e.g. 3GPP TS 38.300 v15.6.0, section 4).

The user plane protocol stack for NR (see e.g. 3GPP TS 38.300, section 4.4.1) comprises the PDCP (Packet Data Convergence Protocol, see section 6.4 of TS 38.300), RLC (Radio Link Control, see section 6.3 of TS 38.300) and MAC (Medium Access Control, see section 6.2 of TS 38.300) sublayers, which are terminated in the gNB on the network side. Additionally, a new access stratum (AS)

sublayer (SDAP, Service Data Adaptation Protocol) is introduced above PDCP (see e.g. sub-clause 6.5 of 3GPP TS 38.300). A control plane protocol stack is also defined for NR (see for instance TS 38.300, section 4.4.2). An overview of the Layer 2 functions is given in sub-clause 6 of TS 38.300. The functions of the PDCP, RLC and MAC sublayers are listed respectively in sections 6.4, 6.3, and 6.2 of TS 38.300. The functions of the RRC layer are listed in sub-clause 7 of TS 38.300.

For instance, the Medium-Access-Control layer handles logical-channel multiplexing, and scheduling and scheduling-related functions, including handling of different numerologies.

The physical layer (PHY) is for example responsible for coding, PHY HARQ processing, modulation, multi-antenna processing, and mapping of the signal to the appropriate physical time-frequency resources. It also handles mapping of transport channels to physical channels. The physical layer provides services to the MAC layer in the form of transport channels. A physical channel corresponds to the set of time-frequency resources used for transmission of a particular transport channel, and each transport channel is mapped to a corresponding physical channel. For instance, the physical channels are PRACH (Physical Random Access Channel), PUSCH (Physical Uplink Shared Channel) and PUCCH (Physical Uplink Control Channel) for uplink and PDSCH (Physical Downlink Shared Channel), PDCCH (Physical Downlink Control Channel) and PBCH (Physical Broadcast Channel) for downlink.

Use cases/deployment scenarios for NR could include enhanced mobile broadband (eMBB), ultra-reliable low-latency communications (URLLC), massive machine type communication (mMTC), which have diverse requirements in terms of data rates, latency, and coverage. For example, eMBB is expected to support peak data rates (20 Gbps for downlink and 10 Gbps for uplink) and user-experienced data rates in the order of three times what is offered by IMT-Advanced. On the other hand, in case of URLLC, the tighter requirements are put on ultra-low latency (0.5 ms for UL and DL each for user plane latency) and high reliability ($1$-$10^{-5}$ within 1 ms). Finally, mMTC may preferably require high connection density ($1,000,000$ devices/$km^2$ in an urban environment), large coverage in harsh environments, and extremely long-life battery for low cost devices (15 years).

Therefore, the OFDM numerology (e.g. subcarrier spacing, OFDM symbol duration, cyclic prefix (CP) duration, number of symbols per scheduling interval) that is suitable for one use case might not work well for another. For example, low-latency services may preferably require a shorter symbol duration (and thus larger subcarrier spacing) and/or fewer symbols per scheduling interval (aka, TTI) than an mMTC service. Furthermore, deployment scenarios with large channel delay spreads may preferably require a longer CP duration than scenarios with short delay spreads. The subcarrier spacing should be optimized accordingly to retain the similar CP overhead. NR may support more than one value of subcarrier spacing. Correspondingly, subcarrier spacing of 15 kHz, 30 kHz, 60 kHz . . . are being considered at the moment. The symbol duration $T_u$ and the subcarrier spacing $\Delta f$ are directly related through the formula $\Delta f=1/T_u$. In a similar manner as in LTE systems, the term "resource element" can be used to denote a minimum resource unit being composed of one subcarrier for the length of one OFDM/SC-FDMA symbol.

In the new radio system 5G-NR for each numerology and carrier a resource grid of subcarriers and OFDM symbols is defined respectively for uplink and downlink. Each element in the resource grid is called a resource element and is identified based on the frequency index in the frequency domain and the symbol position in the time domain (see 3GPP TS 38.211 v15.6.0).

(Control Signals)

In the present disclosure, the downlink control signal (information) related to the present disclosure may be a signal (information) transmitted through PDCCH of the physical layer or may be a signal (information) transmitted through a MAC Control Element (CE) of the higher layer or the RRC. The downlink control signal may be a pre-defined signal (information).

The uplink control signal (information) related to the present disclosure may be a signal (information) transmitted through PUCCH of the physical layer or may be a signal (information) transmitted through a MAC CE of the higher layer or the RRC. Further, the uplink control signal may be a pre-defined signal (information). The uplink control signal may be replaced with uplink control information (UCI), the 1st stage sidelink control information (SCI) or the 2nd stage SCI.

(Base Station)

In the present disclosure, the base station may be a Transmission Reception Point (TRP), a clusterhead, an access point, a Remote Radio Head (RRH), an eNodeB (eNB), a gNodeB (gNB), a Base Station (BS), a Base Transceiver Station (BTS), a base unit or a gateway, for example. Further, in side link communication, a terminal may be adopted instead of a base station. The base station may be a relay apparatus that relays communication between a higher node and a terminal. The base station may be a roadside unit as well.

(Uplink/Downlink/Sidelink)

The present disclosure may be applied to any of uplink, downlink and sidelink.

The present disclosure may be applied to, for example, uplink channels, such as PUSCH, PUCCH, and PRACH, downlink channels, such as PDSCH, PDCCH, and PBCH, and side link channels, such as Physical Sidelink Shared Channel (PSSCH), Physical Sidelink Control Channel (PSCCH), and Physical Sidelink Broadcast Channel (PSBCH).

PDCCH, PDSCH, PUSCH, and PUCCH are examples of a downlink control channel, a downlink data channel, an uplink data channel, and an uplink control channel, respectively. PSCCH and PSSCH are examples of a sidelink control channel and a sidelink data channel, respectively. PBCH and PSBCH are examples of broadcast channels, respectively, and PRACH is an example of a random access channel.

(Data Channels/Control Channels)

The present disclosure may be applied to any of data channels and control channels. The channels in the present disclosure may be replaced with data channels including PDSCH, PUSCH and PSSCH and/or control channels including PDCCH, PUCCH, PBCH, PSCCH, and PSBCH.

(Reference Signals)

In the present disclosure, the reference signals are signals known to both a base station and a mobile station and each reference signal may be referred to as a Reference Signal (RS) or sometimes a pilot signal. The reference signal may be any of a DMRS, a Channel State Information-Reference Signal (CSI-RS), a Tracking Reference Signal (TRS), a Phase Tracking Reference Signal (PTRS), a Cell-specific Reference Signal (CRS), and a Sounding Reference Signal (SRS).

(Time Intervals)

In the present disclosure, time resource units are not limited to one or a combination of slots and symbols, and may be time resource units, such as frames, superframes, subframes, slots, time slot subslots, minislots, or time resource units, such as symbols, Orthogonal Frequency Division Multiplexing (OFDM) symbols, Single Carrier-Frequency Division Multiplexing Access (SC-FDMA) symbols, or other time resource units. The number of symbols included in one slot is not limited to any number of symbols exemplified in the embodiment(s) described above, and may be other numbers of symbols.

(Frequency Bands)

The present disclosure may be applied to any of a licensed band and an unlicensed band.

(Communication)

The present disclosure may be applied to any of communication between a base station and a terminal (Uu-link communication), communication between a terminal and a terminal (Sidelink communication), and Vehicle to Everything (V2X) communication. The channels in the present disclosure may be replaced with PSCCH, PSSCH, Physical Sidelink Feedback Channel (PSFCH), PSBCH, PDCCH, PUCCH, PDSCH, PUSCH, and PBCH.

In addition, the present disclosure may be applied to any of a terrestrial network or a network other than a terrestrial network (NTN: Non-Terrestrial Network) using a satellite or a High Altitude Pseudo Satellite (HAPS). In addition, the present disclosure may be applied to a network having a large cell size, and a terrestrial network with a large delay compared with a symbol length or a slot length, such as an ultra-wideband transmission network.

(Antenna Ports)

An antenna port refers to a logical antenna (antenna group) formed of one or more physical antenna(s). That is, the antenna port does not necessarily refer to one physical antenna and sometimes refers to an array antenna formed of multiple antennas or the like. For example, it is not defined how many physical antennas form the antenna port, and instead, the antenna port is defined as the minimum unit through which a terminal is allowed to transmit a reference signal. The antenna port may also be defined as the minimum unit for multiplication of a precoding vector weighting.

5G NR Functional Split Between NG-RAN and 5GC

Figure 2:
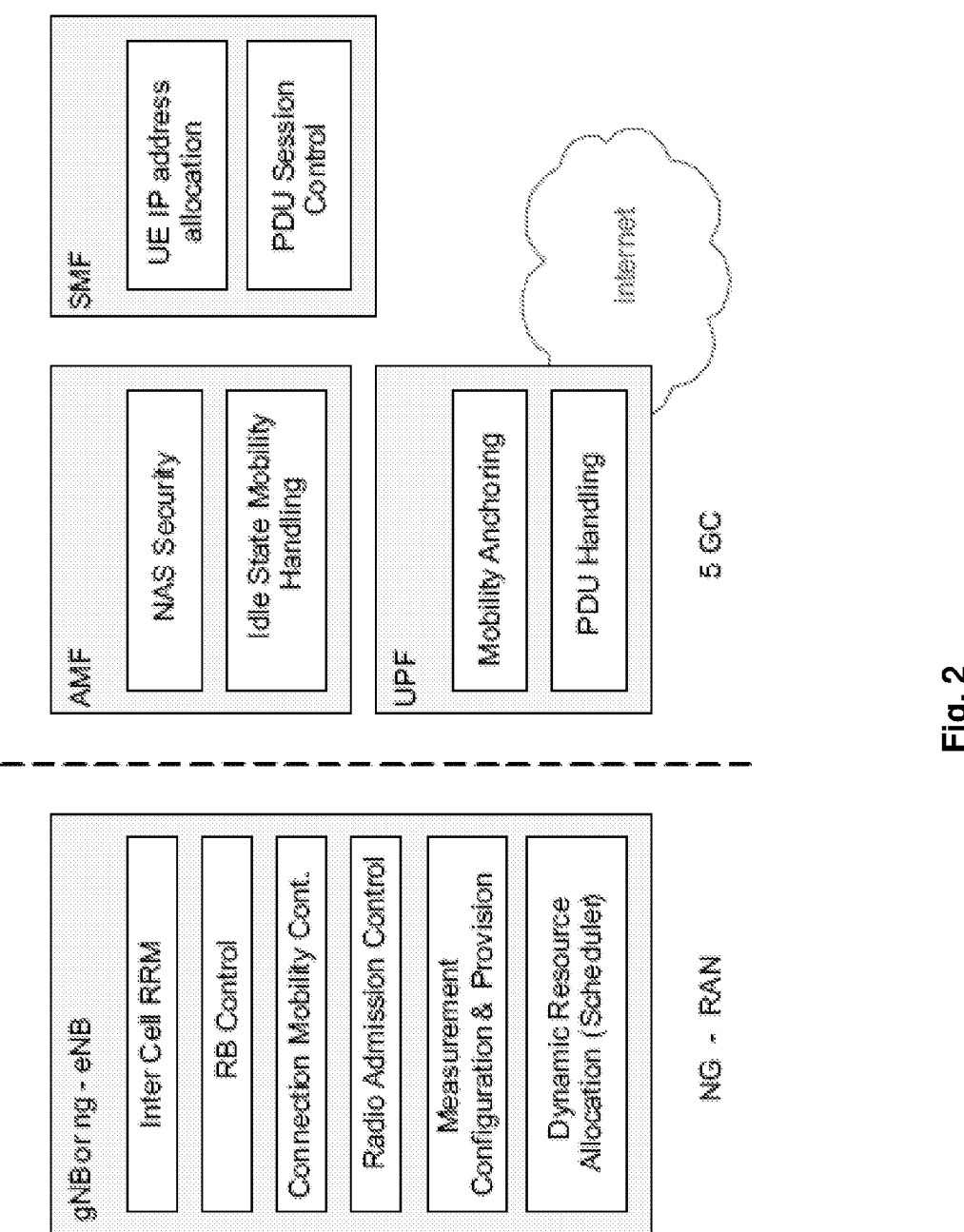
FIG. 2 is a schematic drawing which shows functional split between NG-RAN and 5GC.

FIG. 2 illustrates functional split between NG-RAN and 5GC. NG-RAN logical node is a gNB or ng-eNB. The 5GC has logical nodes AMF, UPF and SMF.

In particular, the gNB and ng-eNB host the following main functions:

Functions for Radio Resource Management such as Radio Bearer Control, Radio Admission Control, Connection Mobility Control, Dynamic allocation of resources to UEs in both uplink and downlink (scheduling);

IP header compression, encryption and integrity protection of data;

Selection of an AMF at UE attachment when no routing to an AMF can be determined from the information provided by the UE;

Routing of User Plane data towards UPF(s);

Routing of Control Plane information towards AMF;

Connection setup and release;

Scheduling and transmission of paging messages;

Scheduling and transmission of system broadcast information (originated from the AMF or OAM);

Measurement and measurement reporting configuration for mobility and scheduling;

Transport level packet marking in the uplink;

Session Management;

Support of Network Slicing;

QoS Flow management and mapping to data radio bearers;

Support of UEs in RRC_INACTIVE state;

Distribution function for NAS messages;

Radio access network sharing;

Dual Connectivity;

Tight interworking between NR and E-UTRA.

The Access and Mobility Management Function (AMF) hosts the following main functions:

Non-Access Stratum, NAS, signalling termination;

NAS signalling security;

Access Stratum, AS, Security control;

Inter Core Network, CN, node signalling for mobility between 3GPP access networks;

Idle mode UE Reachability (including control and execution of paging retransmission);

Registration Area management;

Support of intra-system and inter-system mobility;

Access Authentication;

Access Authorization including check of roaming rights;

Mobility management control (subscription and policies);

Support of Network Slicing;

Session Management Function, SMF, selection.

Furthermore, the User Plane Function, UPF, hosts the following main functions:

Anchor point for Intra-/Inter-RAT mobility (when applicable);

External PDU session point of interconnect to Data Network;

Packet routing & forwarding;

Packet inspection and User plane part of Policy rule enforcement;

Traffic usage reporting;

Uplink classifier to support routing traffic flows to a data network;

Branching point to support multi-homed PDU session;

QoS handling for user plane, e.g. packet filtering, gating, UL/DL rate enforcement;

Uplink Traffic verification (SDF to QoS flow mapping);

Downlink packet buffering and downlink data notification triggering.

Finally, the Session Management function, SMF, hosts the following main functions:

Session Management;

UE IP address allocation and management;

Selection and control of UP function;

Configures traffic steering at User Plane Function, UPF, to route traffic to proper destination;

Control part of policy enforcement and QoS;

Downlink Data Notification.

RRC Connection Setup and Reconfiguration Procedures

Figure 3:
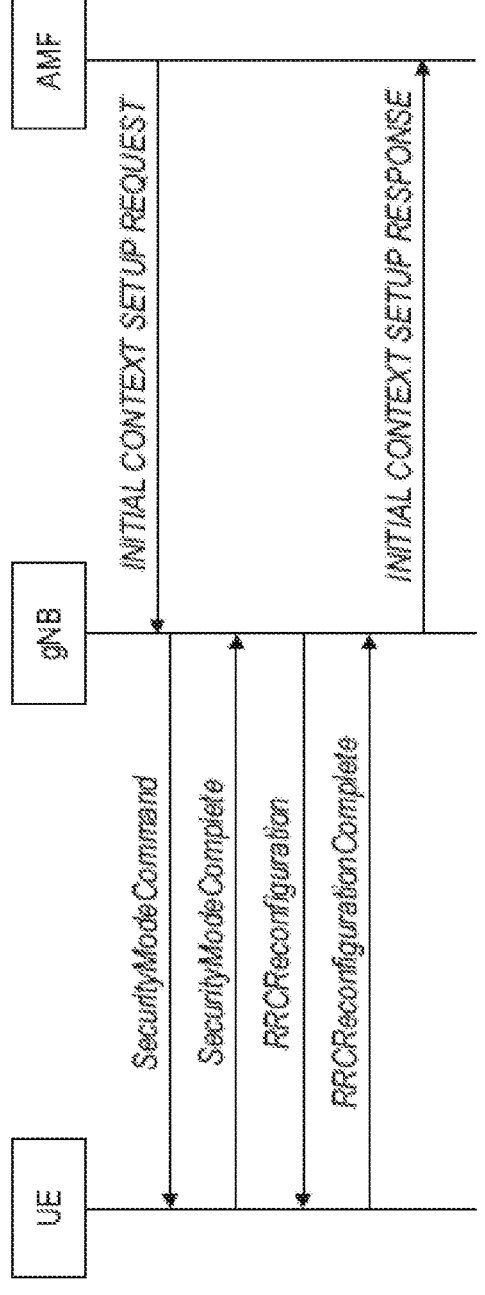
FIG. 3 is a sequence diagram for RRC connection setup/reconfiguration procedures.

FIG. 3 illustrates some interactions between a UE, gNB, and AMF (an 5GC entity) in the context of a transition of the UE from RRC_IDLE to RRC_CONNECTED for the NAS part (see TS 38.300 v15.6.0). RRC is a higher layer signaling (protocol) used for UE and gNB configuration. In particular, this transition involves that the AMF prepares the UE context data (including e.g. PDU session context, the Security Key, UE Radio Capability and UE Security Capabilities, etc.) and sends it to the gNB with the INITIAL CONTEXT SETUP REQUEST. Then, the gNB activates the AS security with the UE, which is performed by the gNB transmitting to the UE a SecurityModeCommand message and by the UE responding to the gNB with the SecurityModeComplete message. Afterwards, the gNB performs the reconfiguration to setup the Signaling Radio Bearer 2, SRB2, and Data Radio Bearer(s), DRB(s) by means of transmitting to the UE the RRCReconfiguration message and, in response, receiving by the gNB the RRCReconfigurationComplete from the UE. For a signalling-only connection, the steps relating to the RRCReconfiguration are skipped since SRB2 and DRBs are not setup. Finally, the gNB informs the AMF that the setup procedure is completed with the INITIAL CONTEXT SETUP RESPONSE.

In the present disclosure, thus, an entity (for example AMF, SMF, etc.) of a 5th Generation Core (5GC) is provided that comprises control circuitry which, in operation, establishes a Next Generation (NG) connection with a gNodeB, and a transmitter which, in operation, transmits an initial context setup message, via the NG connection, to the gNodeB to cause a signaling radio bearer setup between the gNodeB and a user equipment (UE). In particular, the gNodeB transmits a Radio Resource Control, RRC, signaling containing a resource allocation configuration information element to the UE via the signaling radio bearer. The UE then performs an uplink transmission or a downlink reception based on the resource allocation configuration.

Usage Scenarios of IMT for 2020 and Beyond

Figure 4:
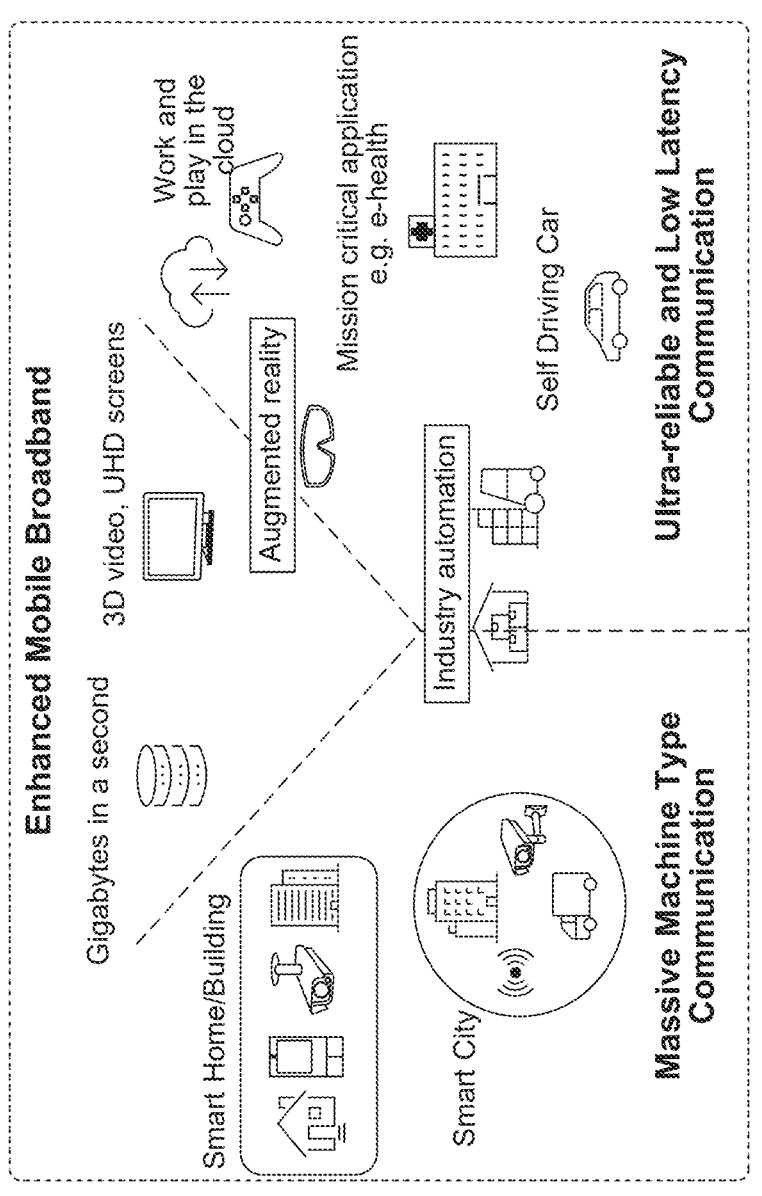
FIG. 4 is a schematic drawing showing usage scenarios of Enhanced mobile broadband (eMBB), Massive Machine Type Communications (mMTC) and Ultra Reliable and Low Latency Communications (URLLC).

FIG. 4 illustrates some of the use cases for 5G NR. In 3rd generation partnership project new radio (3GPP NR), three use cases are being considered that have been envisaged to support a wide variety of services and applications by IMT-2020. The specification for the phase 1 of enhanced mobile-broadband (eMBB) has been concluded. In addition to further extending the eMBB support, the current and future work would involve the standardization for ultra-reliable and low-latency communications (URLLC) and massive machine-type communications. FIG. 4 illustrates some examples of envisioned usage scenarios for IMT for 2020 and beyond (see e.g. ITU-R M.2083 FIG. 2).

The URLLC use case has stringent requirements for capabilities such as throughput, latency and availability and has been envisioned as one of the enablers for future vertical applications such as wireless control of industrial manufacturing or production processes, remote medical surgery, distribution automation in a smart grid, transportation safety, etc. Ultra-reliability for URLLC is to be supported by identifying the techniques to meet the requirements set by TR 38.913. For NR URLLC in Release 15, key requirements include a target user plane latency of 0.5 ms for UL (uplink) and 0.5 ms for DL (downlink). The general URLLC requirement for one transmission of a packet is a BLER (block error rate) of 1E-5 for a packet size of 32 bytes with a user plane latency of 1 ms.

From the physical layer perspective, reliability can be improved in a number of possible ways. The current scope for improving the reliability involves defining separate CQI tables for URLLC, more compact downlink control information (DCI) formats, repetition of PDCCH, etc. However, the scope may widen for achieving ultra-reliability as the NR becomes more stable and developed (for NR URLLC key requirements). Particular use cases of NR URLLC in Rel. 15 include Augmented Reality/Virtual Reality (AR/VR), e-health, e-safety, and mission-critical applications.

Moreover, technology enhancements targeted by NR URLLC aim at latency improvement and reliability improvement. Technology enhancements for latency improvement include configurable numerology, non-slot-based (mini-slot-based) scheduling with flexible mapping, grant free (configured grant) uplink, slot-level repetition for data channels, and downlink pre-emption. Pre-emption means that a transmission for which resources have already been allocated is stopped, and the already allocated resources are used for another transmission that has been requested later, but has lower latency/higher priority requirements. Accordingly, the already granted transmission is pre-empted by a later transmission. Pre-emption is applicable independent of the particular service type. For example, a transmission for a service-type A (URLLC) may be pre-empted by a transmission for a service type B (such as eMBB). Technology enhancements with respect to reliability improvement include dedicated CQI/MCS tables for the target BLER of 1E-5.

The use case of mMTC (massive machine type communication) is characterized by a very large number of connected devices typically transmitting a relatively low volume of non-delay sensitive data. Devices are required to be low cost and to have a very long battery life. From NR perspective, utilizing very narrow bandwidth parts is one possible solution to have power saving from UE perspective and enable long battery life.

As mentioned above, it is expected that the scope of reliability in NR becomes wider. One key requirement to all the cases, and especially necessary for URLLC and mMTC, is high reliability or ultra-reliability. Several mechanisms can be considered to improve the reliability from radio perspective and network perspective. In general, there are a few key potential areas that can help improve the reliability. Among these areas are compact control channel information, data/control channel repetition, and diversity with respect to frequency, time and/or the spatial domain. These areas are applicable to reliability in general, regardless of particular communication scenarios.

For NR URLLC, further use cases with tighter requirements have been identified such as factory automation, transport industry and electrical power distribution, including factory automation, transport industry, and electrical power distribution. The tighter requirements are higher reliability (up to $10^{-6}$ level), higher availability, packet sizes of up to 256 bytes, time synchronization down to the order of a few μs where the value can be one or a few μs depending on frequency range and short latency in the order of 0.5 to 1 ms in particular a target user plane latency of 0.5 ms, depending on the use cases.

Moreover, for NR URLLC, several technology enhancements from the physical layer perspective have been identified. Among these are PDCCH (Physical Downlink Control Channel) enhancements related to compact DCI, PDCCH repetition, increased PDCCH monitoring. Moreover, UCI (Uplink Control Information) enhancements are related to enhanced HARQ (Hybrid Automatic Repeat Request) and CSI feedback enhancements. Also PUSCH enhancements related to mini-slot level hopping and retransmission/repetition enhancements have been identified. The term "mini-slot" refers to a Transmission Time Interval (TTI) including a smaller number of symbols than a slot (a slot comprising fourteen symbols).

QoS Control

The 5G QoS (Quality of Service) model is based on QoS flows and supports both QoS flows that require guaranteed flow bit rate (GBR QoS flows) and QoS flows that do not require guaranteed flow bit rate (non-GBR QoS Flows). At NAS level, the QoS flow is thus the finest granularity of QoS differentiation in a PDU session. A QoS flow is identified within a PDU session by a QoS flow ID (QFI) carried in an encapsulation header over NG-U interface.

For each UE, 5GC establishes one or more PDU Sessions. For each UE, the NG-RAN establishes at least one Data Radio Bearers (DRB) together with the PDU Session, and additional DRB(s) for QoS flow(s) of that PDU session can be subsequently configured (it is up to NG-RAN when to do so), e.g. as shown above with reference to FIG. 3. The NG-RAN maps packets belonging to different PDU sessions to different DRBs. NAS level packet filters in the UE and in the 5GC associate UL and DL packets with QoS Flows, whereas AS-level mapping rules in the UE and in the NG-RAN associate UL and DL QoS Flows with DRBs.

Figure 5:
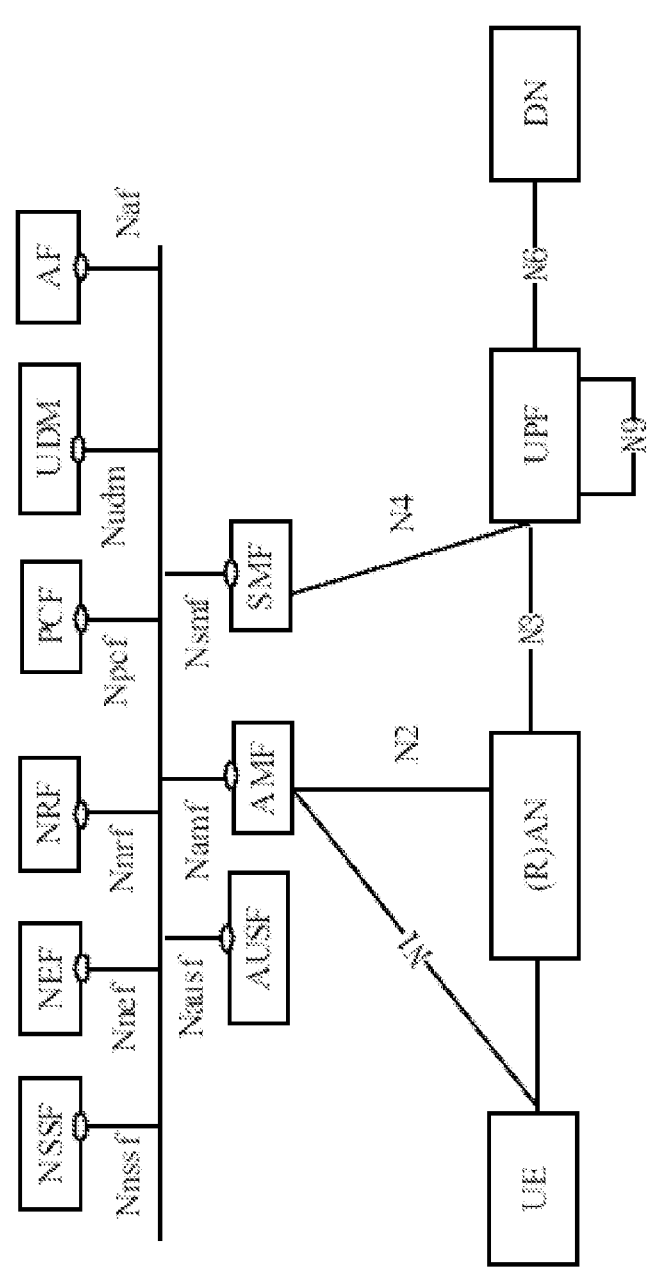
FIG. 5 is a block diagram showing an exemplary 5G system architecture for a non-roaming scenario.

FIG. 5 illustrates a 5G NR non-roaming reference architecture (see TS 23.501 v16.1.0, section 4.23). An Application Function (AF), e.g. an external application server hosting 5G services, exemplarily described in FIG. 4, interacts with the 3GPP Core Network in order to provide services, for example to support application influence on traffic routing, accessing Network Exposure Function (NEF) or interacting with the Policy framework for policy control (see Policy Control Function, PCF), e.g. QoS control. Based on operator deployment, Application Functions considered to be trusted by the operator can be allowed to interact directly with relevant Network Functions. Application Functions not allowed by the operator to access directly the Network Functions use the external exposure framework via the NEF to interact with relevant Network Functions.

FIG. 5 shows further functional units of the 5G architecture, namely Network Slice Selection Function (NSSF), Network Repository Function (NRF), Unified Data Management (UDM), Authentication Server Function (AUSF), Access and Mobility Management Function (AMF), Session Management Function (SMF), and Data Network (DN), e.g. operator services, Internet access or 3rd party services. All of or a part of the core network functions and the application services may be deployed and running on cloud computing environments.

A new study item (SI) on support of reduced capability (RedCap) NR devices (also known as NR Light/Lite) was approved in RANP #86 [RP-193238]. The aim of this SI is to support a lighter version of NR for mid-tier NR devices (e.g., smart watches, video surveillance cameras, and industrial sensors), where their requirements on high throughput, latency, and reliability are not very critical. One of the main objectives of this SI is to identify and study potential UE complexity reduction features, such as:

Reduced number of UE RX/TX antennas

UE Bandwidth reduction (wherein Rel-15 SSB bandwidth should be reused and L1 changes minimized)

Half-Duplex-frequency division duplex (FDD)

Relaxed UE processing time

Relaxed UE processing capability

A UE can be configured with up to 12 control resource sets (CORESETs) (indices 0-11) on a serving cell. CORESETs are configured in units of six physical resource blocks (PRBs) on a six PRB frequency grid and one, two, or three consecutive OFDM symbols in the time domain. CORESET with index 0 (i.e., CORESET #0, also known as the first CORESET) is acquired by the UE for such initial cell selection or initial access before any dedicated higher-layer configurations are provided. The CORESET #0 can be configured by some pre-defined process and pre-defined parameters.

Upon detection of a synchronization signal block (SSB), master information block (MIB) is derived from the physical broadcast channel (PBCH) by the UE. If $k_{SSB} \le 23$ for frequency range 1 (FR1) or if $k_{SSB} \le 11$ for frequency range 2 (FR2), the UE determines a number of consecutive resource blocks and a number of consecutive symbols for the CORESET of the Type0-PDCCH CSS set (i.e., CORESET #0)

from controlResourceSetZero in pdcch-ConfigSIB1 of MIB information element (IE), as described in Tables 13.1-13.10 of TS 38.213, and determines PDCCH monitoring occasions from searchSpaceZero in pdcch-ConfigSIB1, as described in Tables 13.11-13.15 of TS 38.213. On the other hand, if $k_{SSB} \ge 23$ for FR1 or if $k_{SSB} > 11$ for FR2, CORESET #0 is not present in MIB IE, it may be provided by controlResourceSetZero in PDCCH-ConfigCommon or by searchSpaceZero in PDCCH-ConfigCommon for a DCI format with cyclic redundancy check (CRC) scrambled by a System information—Radio Network Temporary Identifier (SI-RNTI) on a primary cell of a master cell group (MCG).

However, potential issues arise when the bandwidth (BW) of Rel-15 CORESET #0 is/can be greater than the BW of the RedCap UEs, such as illustrated in FIG. 6 in which the Rel-CORESET #0 BW 602 exceeds the RedCap UE BW 604 In addition, the bandwidth of SIB1 PDSCH scheduled by current Rel-15 CORESET #0 could also be greater than the BW of the RedCap NR devices. It can lead to failures of initial cell selection, handover, etc.

Figure 7:
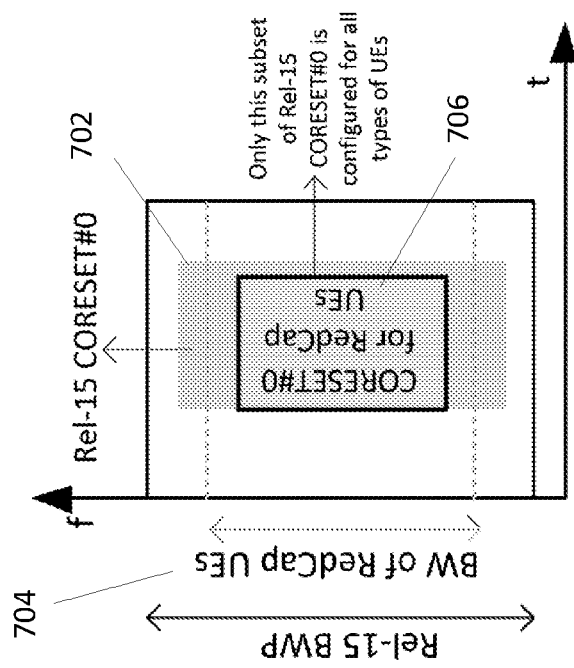
FIG. 7 shows an example of a bandwidth comparison between a Rel-15 CORESET with index 0 (CORESET #0) and a CORESET #0 for a RedCap UE in accordance with various embodiments.

Therefore, the present disclosure provides for a solution in which a UE receives a PDCCH on CORESET #0 of which time and frequency resources are defined based on the bandwidth configuration associated with RedCap UEs. This PDCCH on CORESET #0 is used to schedule system information type 1 (SIB1) PDSCH, Msg2 PDSCH, and Msg4 PDSCH for the RedCap UEs. Advantageously, this allows NR Light/Lite (or RedCap) UEs with narrower bandwidth capability to read SIB1 for initial access. In addition, during the initial access, Msg2 PDSCH and Msg4 PDSCH are transmitted within the CORESET #0 bandwidth. According to an embodiment 1, based on a suitable BW of the RedCap UEs, a subset/part of Rel-15 CORESET #0 can be configured for the RedCap UEs, i.e., a subset of entries of Tables 13.1-13.10 described in TS 38.213. As shown in example diagram 700 of FIG. 7, only subset/part 706 of Rel-15 CORESET #0 702 is available to configure for all types of UEs (i.e., normal Rel-15/16/17 UEs and RedCap UEs) in the concerned network. The subset/part 706 is defined based on the BW of the RedCap UEs, such that it has a BW that is smaller than the RedCap UE BW 704, as can be seen in FIG. 7. Legacy operation and indications for the UEs can still be reused.

According to embodiment 1, RedCap UEs may assume that the BW of CORESET #0 indicated in MIB based on Table 13.1-13.10 in TS 38.213 is equal to or less than their BW, or if the CORESET #0 BW indicated in MIB based on Table 13.1-13.10 in TS 38.213 is larger than the UE's BW, the UE shall discard (or ignore) the SSB. Advantageously, searching complexity is simplified due to reducing common search space (CSS) and/or UE-specific search space (USS) sets. Further, additional overhead is avoided due to the introduction of NR light/lite (or RedCap) UEs.

When BW of RedCap UEs is 5 or 10 MHz, {SSB, PDCCH} SCS is {15, 15} kHz, examples of subsets of Rel-15 CORESET #0 for the RedCap UEs are shown in Table 800 of FIG. 8A and Table 802 of FIG. 8B, respectively, both tables based on Table 13.1 of TS 38.213. For example, Table 800 presents a subset of RBs and slot symbols of CORESET #0 when {SSB, PDCCH} SCS is {15, 15} kHz for frequency bands with minimum channel BW of 5 MHz i.e. in index 0-5. Table 802, on the other hand, shows a subset of RBs and slot symbols of CORESET #0 when {SSB, PDCCH} SCS is {15, 15} kHz for frequency bands with minimum channel BW of 10 MHz i.e. in index 0-11. It will be appreciated that a similar approach can be used to define subsets of entries of Table 13.2-13.10 for the RedCap UEs, such that subsets of entries of Tables 13.1-13.10 are defined based on the BW of RedCap UEs.

Figure 9:
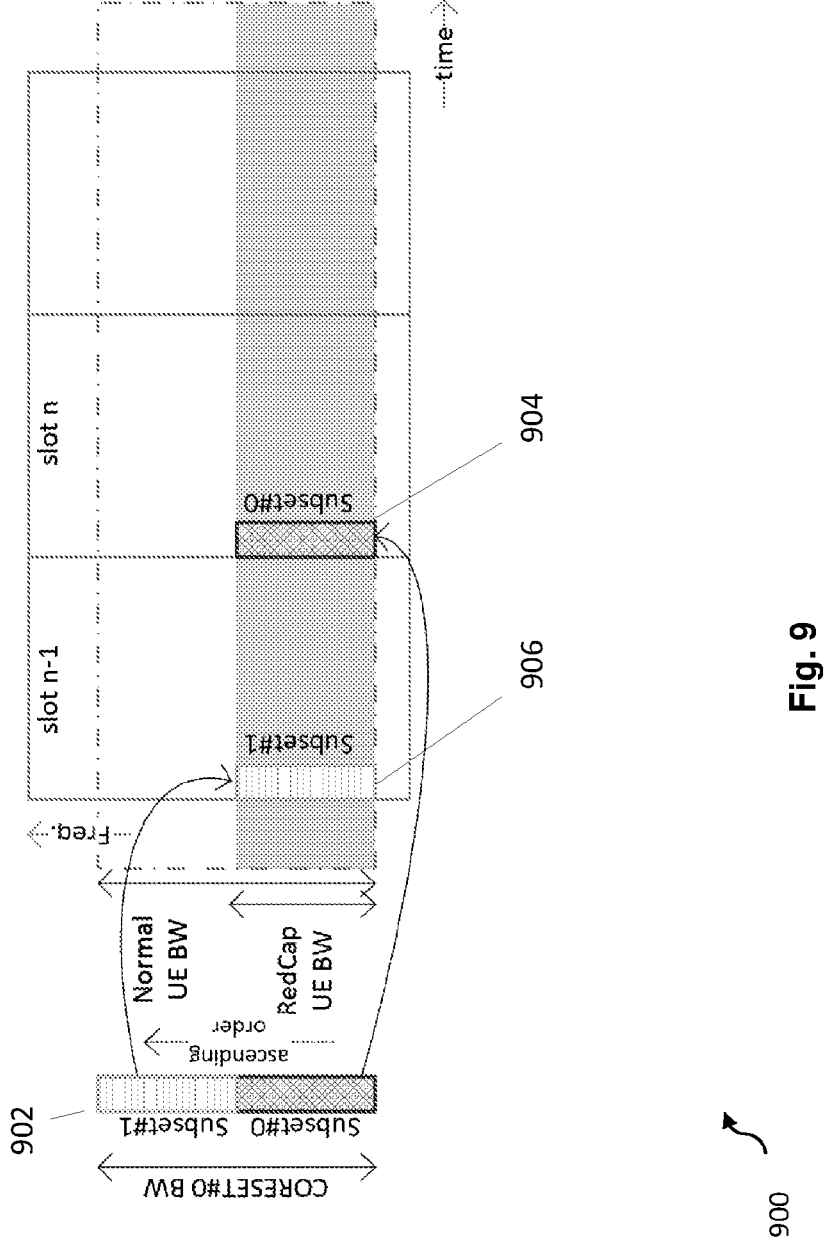
FIG. 9 shows a schematic diagram illustrating transmission for subsets of Rel-15 CORESET #0 in accordance with an embodiment 2.

According to an embodiment 2, the Rel-15 CORESET #0 is partitioned into m equal or unequal subset(s) such that $m \geq 1$, when the BW of Rel-15 CORESET #0 is greater than that of the RedCap UEs. FIG. 9 shows a schematic diagram 900 illustrating transmission for subsets of Rel-15 CORE-SET #0 902 in accordance with embodiment 2. The Rel-15 CORESET #0 902 is partitioned into 2 subsets 904 and 906, wherein subset 904 is mapped to slot n and subset 906 is mapped to slot n−1. The BW of each subset 904, 906 of Rel-15 CORESET #0 is not greater than the BW of RedCap UEs. Each subset of Rel-15 CORESET #0, i.e., CORESET #0 for RedCap UEs, can be a subset of entries of Tables 13.1-13.10 in TS 38.213 or a subset of physical resources such as control channel elements (CCEs) or physical resource blocks (PRBs) of Rel-15 CORESET #0. An upper limit form is dependent on UE capability, consideration of channel delay/estimation, or periodicity of SSB.

A PDCCH can be carried by 1, 2, 4, 8 or 16 CCEs to accommodate different DCI payload size or different coding rates, where the number of CCEs for the PDCCCH is specified by aggregation level. Each CCE consists of 6 resource element groups (REGs), where each REG consists of the 12 resource elements (REs) of one OFDM symbol in one PRB.

The current indication of Rel-15 CORESET #0 for normal UEs is used to present the CORESET #0 for the RedCap UEs, i.e., the existing entries of ControlResourceSetZero and SearchSpaceZero IEs in MIB. The ith subset of Rel-15 CORESET #0 is configured in the corresponding slot n−i, where $0 \leq i < m$, and slot n can be a PDCCH monitoring occasion (slot or symbol) for Rel.15 CORESET #0 or a PDCCH monitoring occasion configured for RedCap UE. The RedCap UEs make blind decoding (BD) attempts to decode Rel-15 CORESET #0 by combining m subset(s) when they monitor m consecutive slots as shown in diagram 900 of FIG. 9. When m>1, RedCap UEs may need to monitor the partitioned Rel.15 CORESET #0 in a slot which is different from the monitoring occasion defined for Rel.15/16 UEs. Advantageously, the BW of RedCap UEs can be narrower than that of the Rel-15 CORESET #0. When m=2, the existing behaviour of monitoring occasions for CORE-SET #0 is applied for the normal UEs and RedCap UEs.

In a first variation of embodiment 2, the subset mapping and UE behaviours can be as follows:

A full Rel-15 CORESET #0 is mapped in slot n for supporting normal Rel-15/16 UEs The ith subset of Rel-15 CORESET #0 is separately configured in the corresponding slot n−i, where $1 \leq i < m-1$, for supporting RedCap UEs For example: A full Rel-15 CORESET #0 is partitioned into subset #0 and subset #1. A full Rel-15 CORESET #0 is mapped in slot n (i.e., subset #0 is included by Rel-15 CORESET #0 in slot n), while subset #1 is mapped in slot n−1

The normal Rel-15/16 UEs make BD attempts to decode Rel-15 CORESET #0 in slot n

Figure 10:
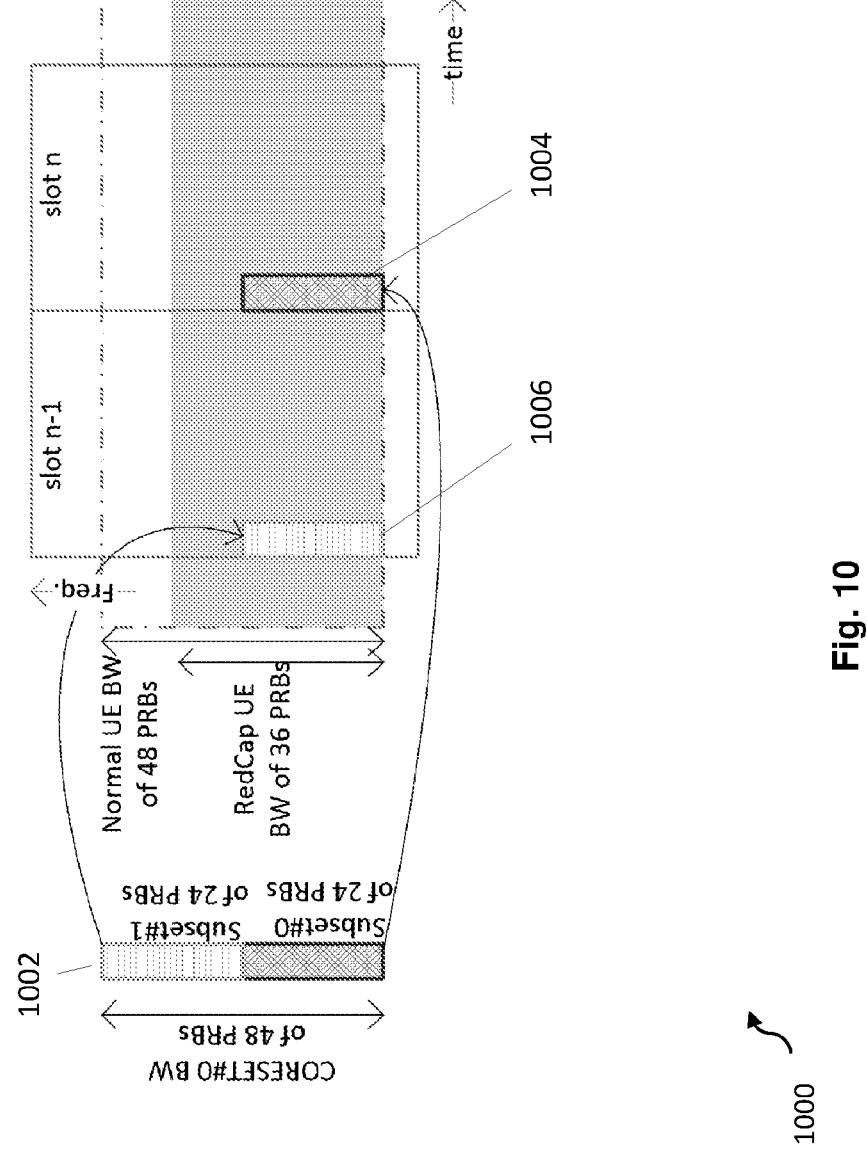
FIG. 10 shows an example of an equal partitioning of Rel-15 CORESET #0 in accordance with an embodiment 2.

The RedCap UEs make BD attempts to decode Rel-15 CORESET #0 by combining m subset(s) in m consecutive slots In a second variation of embodiment 2, the subset mapping and UE behaviours can be as follows:

A full Rel-15 CORESET #0 is mapped in slot n for supporting normal Rel-15/16 UEs The ith subset of Rel-15 CORESET #0 is separately configured in the corresponding slot k−i, where $0 \leq i < m$, for supporting RedCap UEs The value of k can be pre-defined The normal Rel-15/16 UEs make BD attempts to decode Rel-15 CORESET #0 in slot n The RedCap UEs make BD attempts to decode Rel-15 CORESET #0 by combining m subset(s) in m consecutive slots FIG. 10 shows an example diagram 1000 of an equal partitioning of Rel-15 CORESET #0 in accordance with embodiment 2. It is assumed in this example that BWs of normal UEs and RedCap UEs are 48 PRBs and 36 PRBs, respectively, as well as BW of Rel-15 CORESET #0 is 48 PRBs. Rel-15 CORESET #0 1002 is equally partitioned into 2 subsets, i.e., subset #0 1004 and subset #1 1006, each of which has 24 PRBs. Subset #0 1004 of 24 PRBs is mapped to slot n, while Subset #1 1006 of 24 PRBs is mapped to slot n−1. The normal and RedCap UEs make BD attempts to decode Rel-15 CORESET #0 using a combination of receiving PRBs in slot n−1 and slot n.

Figure 11:
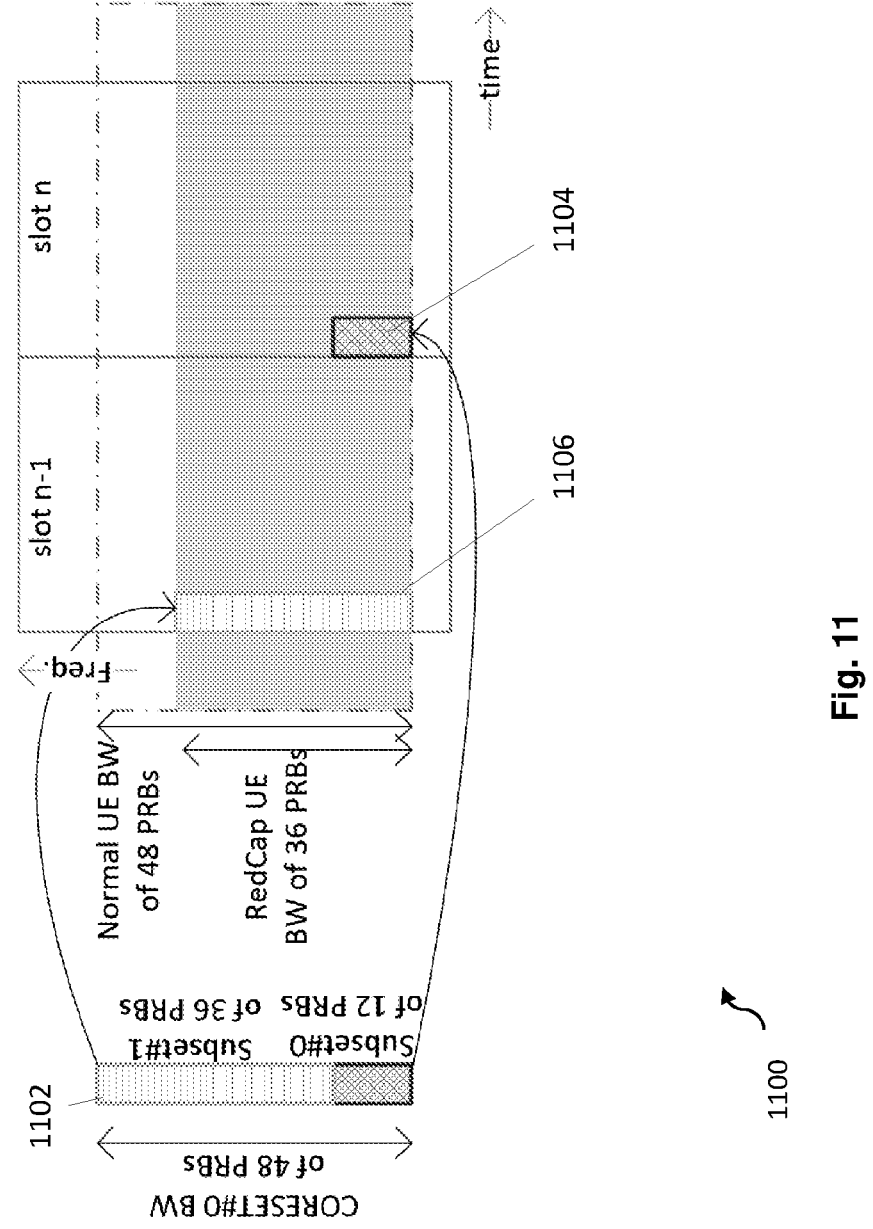
FIG. 11 shows an example of an unequal partitioning of Rel-15 CORESET #0 in accordance with an embodiment 2.

FIG. 11 shows an example diagram 1100 of an unequal partitioning of Rel-15 CORESET #0 in accordance with embodiment 2. It is also assumed in this example that BWs of normal UEs and RedCap UEs are 48 PRBs and 36 PRBs, respectively, as well as BW of Rel-15 CORESET #0 is 48 PRBs. Rel-15 CORESET #0 1102 is unequally partitioned into 2 subsets, where subset #0 1004 has 12 PRBs and subset #1 1006 has 36 PRBs. Among subset #0 1004 and subset #1 1006, a longer subset is assigned to a former slot or a latter slot, or the longer subset among the two subsets can be assigned to a slot of which the channel condition is better than that of other slot. In the present example, Subset #0 1004 of 12 PRBs is mapped to slot n, while Subset #1 1006 of 36 PRBs is mapped to slot n−1. The normal and RedCap UEs then make BD attempts to decode Rel-15 CORESET #0 using a combination of receiving PRBs in slot n−1 and slot n.

Figure 12:
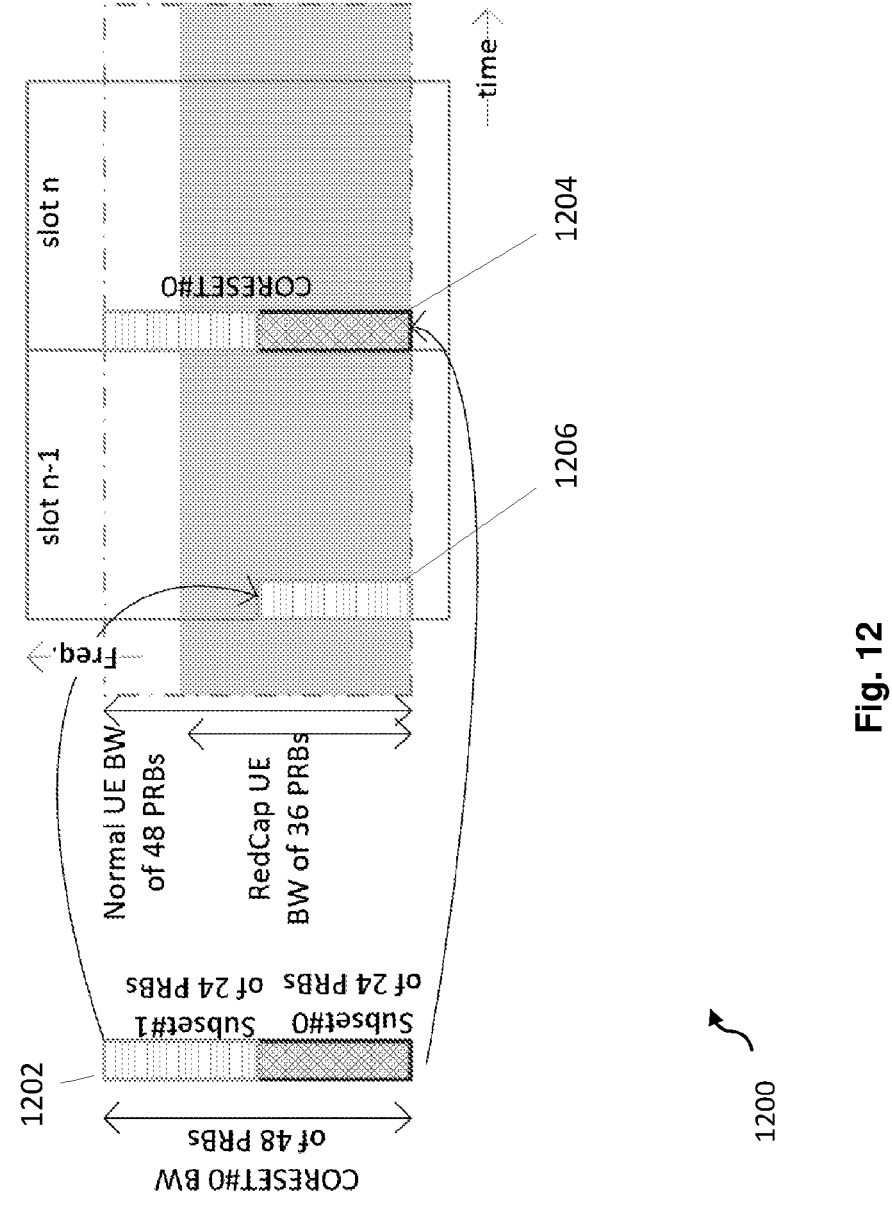
FIG. 12 shows an example of an equal partitioning of Rel-15 CORESET #0 in accordance with a variation of embodiment 2.

FIG. 12 shows an example diagram 1200 of an equal partitioning of a Rel-15 CORESET #0 1202 in accordance with the first variation of embodiment 2. It is also assumed in this example that BWs of normal UEs and RedCap UEs are 48 PRBs and 36 PRBs, respectively, as well as BW of Rel-15 CORESET #0 is 48 PRBs. Rel-15 CORESET #0 1202 is equally partitioned into 2 subsets, i.e., subset #0 1204 and subset #1 1206, each of which has 24 PRBs. The full unpartitioned Rel-15 CORESET #0 1202 is mapped to slot n, while Subset #1 1204 of 24 PRBs is mapped to slot n−1. The normal Rel-15/16 UEs make BD attempts to decode Rel-15 CORESET #0 in slot n, while the RedCap UEs make BD attempts to decode Rel-15 CORESET #0 by combining m subset(s) in m consecutive slots i.e. slot n and slot n−1 in this example.

Figure 13:
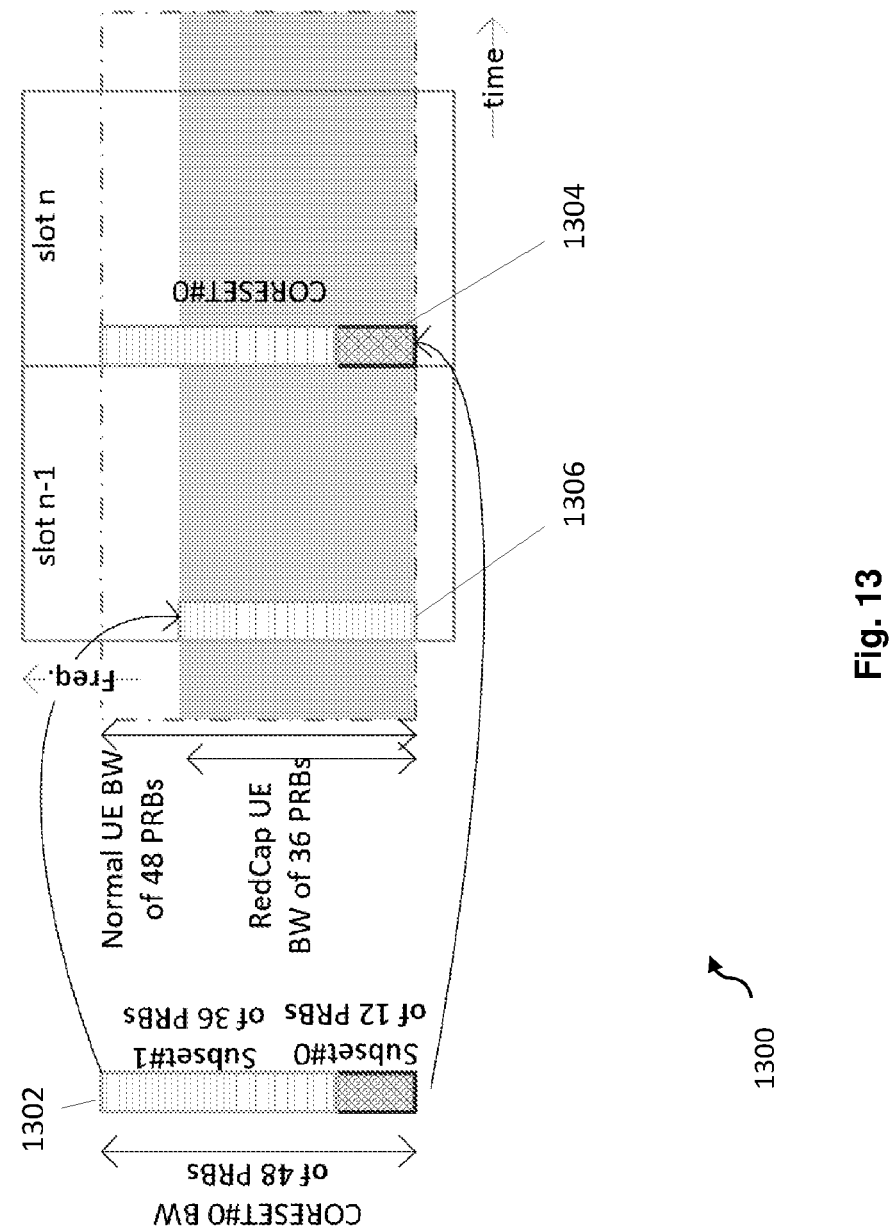
FIG. 13 shows an example of an unequal partitioning of Rel-15 CORESET #0 in accordance with a variation of embodiment 2.

FIG. 13 shows an example diagram 1300 of an unequal partitioning of a Rel-15 CORESET #0 1302 in accordance with the first variation of embodiment 2. It is also assumed in this example that BWs of normal UEs and RedCap UEs are 48 PRBs and 36 PRBs, respectively, as well as BW of Rel-15 CORESET #0 is 48 PRBs. Rel-15 CORESET #0 1302 is unequally partitioned into 2 subsets, i.e., subset #0 1304 and subset #1 1306, where subset #0 1304 has 12 PRBs and subset #1 1306 has 36 PRBs. The full unpartitioned Rel-15 CORESET #0 1302 is mapped to slot n, while Subset #1 1304 of 24 PRBs is mapped to slot n−1. The normal Rel-15/16 UEs make BD attempts to decode Rel-15 CORE-SET #0 in slot n, while the RedCap UEs make BD attempts to decode Rel-15 CORESET #0 by combining m subset(s) in m consecutive slots i.e. slot n and slot n−1 in this example.

According to an embodiment 3, the part of Rel-15 CORESET #0 BW which is outside of RedCap UE BW is partitioned into q equal or unequal subset(s) such that q≥1, when the BW of Rel-15 CORESET #0 is greater than that of the RedCap UEs. The BW of each subset of Rel-15 CORESET #0 is not greater than the BW of RedCap UEs. Each subset of Rel-15 CORESET #0, i.e., CORESET #0 for RedCap UEs, can be a subset of entries of Tables 13.1-13.10 in TS 38.213 or a subset of physical resources such as CCEs of Rel-15 CORESET #0. These subsets are copied & mapped within the BW of RedCap UE in different monitoring occasions (i.e. slot or symbol). An upper limit for q is dependent on UE capability, consideration of channel delay/ estimation, or periodicity of SSB. The current indication of Rel-15 CORESET #0 for the normal UEs is used to present the CORESET #0 for the RedCap UEs, i.e., the existing entries in Control ResourceSetZero and SearchSpaceZero IEs in MIB.

Rel-15 CORESET #0 is signalled to normal UEs and RedCap UEs by using a (pre-)configured rule:

The Rel-15 CORESET #0 is mapped in slot n. The ith subset of Rel-15 CORESET #0 is copied and mapped within the BW of RedCap UE in the corresponding slot n−i, where 1≤i≤q The normal UEs make BD attempts to decode Rel-15 CORESET #0 by monitoring slots n and n−1

Figure 14:
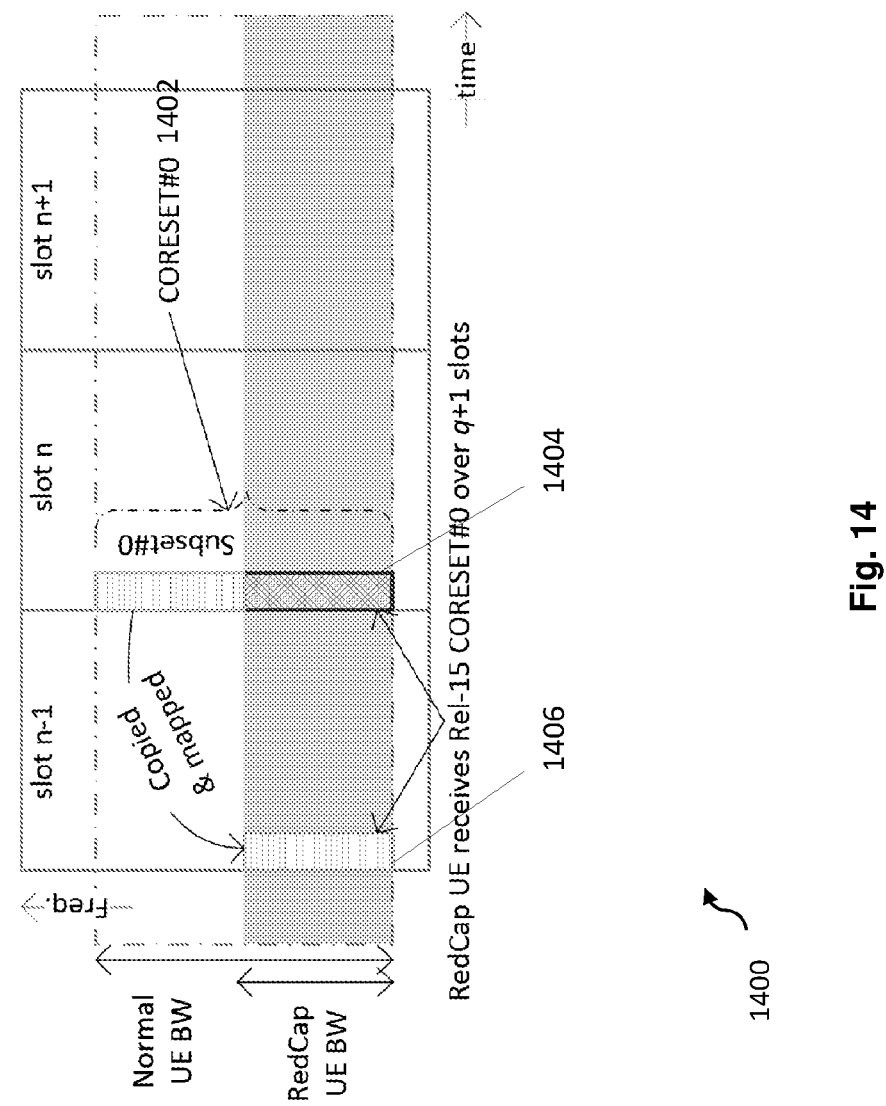
FIG. 14 shows an example of transmission for Rel-15 CORESET #0 and its subset(s) in accordance with an embodiment 3.

The RedCap UEs may assume the number of number of RBs $$N_{RB}^{CORESET}$$

used for the PDSCH resource assignment field is based on Rel-15 CORESET #0 BW indicated in MIB rather than based on RedCap UEs BW The RedCap UEs make BD attempts to decode Rel-15 CORESET #0 by monitoring q+1 consecutive slots FIG. 14 shows an example diagram 1400 of transmission for Rel-15 CORESET #0 1402 and its subset in accordance with embodiment 3. In this example, the part of Rel-15 CORESET #0 1402 BW which is within the RedCap UE BW is Rel-15 CORESET #0 part 1404, while the part of Rel-15 CORESET #0 1402 BW which is outside of RedCap UE BW is subset #0 1406. As the BW of subset #0 1406 does not exceed the RedCap UE BW, it is not partitioned into further subsets (i.e. q=1). The subset #0 1406 is copied & mapped within the BW of RedCap UE in slot n−1. The normal UEs make BD attempts to decode Rel-15 CORESET #0 by monitoring slot n and n−1. The RedCap UEs make BD attempts to decode Rel-15 CORESET #0 by monitoring q+1 consecutive slots (i.e. also slot n and n−1, since q=1 in this example).

Advantageously for embodiment 3, the BW of RedCap UEs can be narrower than that of Rel-15 CORESET #0. Further, when q=1, the existing behaviour of monitoring occasions for CORESET #0 is applied for the normal UEs and RedCap UEs, as can be seen in diagram 1400 of FIG. 14.

Figure 15:
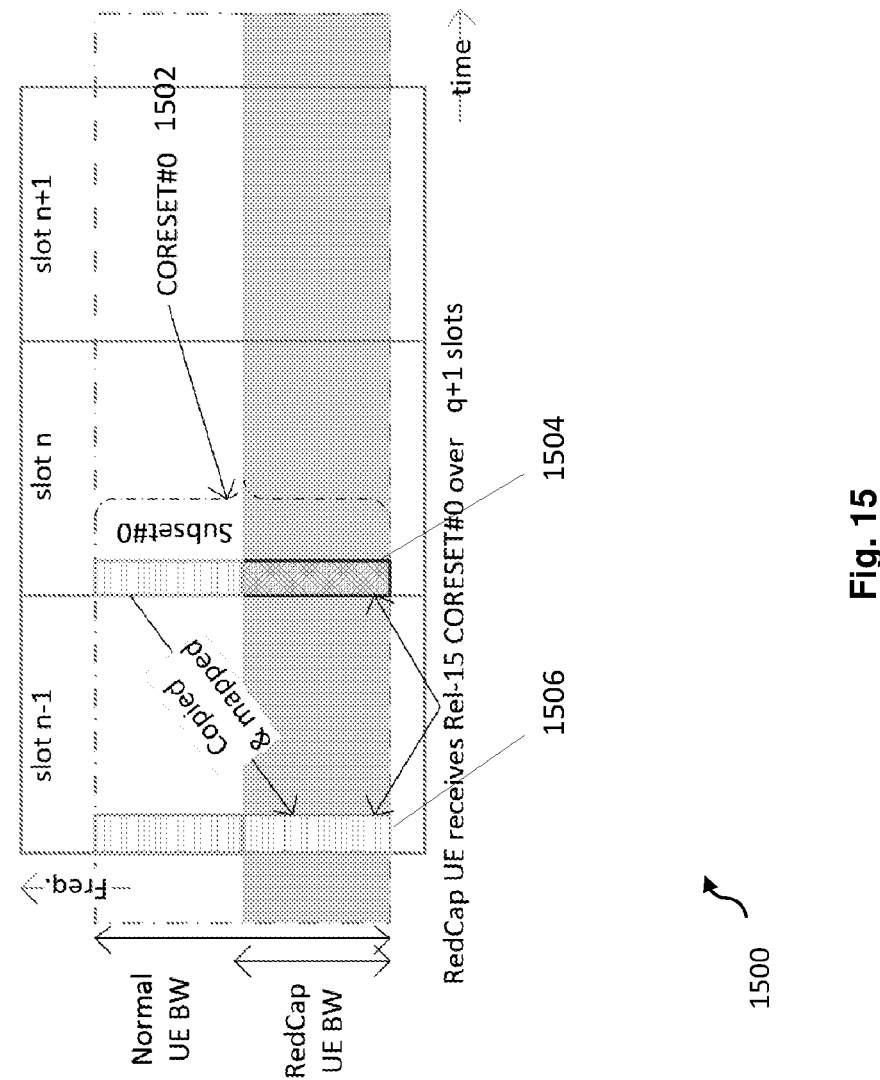
FIG. 15 shows an example of transmission for Rel-15 CORESET #0 and its subset(s) in accordance with a variation of embodiment 3.

FIG. 15 shows an example diagram 1500 of transmission for Rel-15 CORESET #0 1502 and its subset(s) in accordance with a variation of embodiment 3. In this variation, Rel-15 CORESET #0 1502 is signalled to the normal UEs and RedCap UEs by using a (pre-)configured rule as follows:

The Rel-15 CORESET #0 1502 is mapped in slot n

In slot n−i, where 1≤i≤q, only a part 1504 of Rel-15 CORESET #0 mapping inside of the BW, where the RedCap UE can monitor, is replaced by the ith subset of Rel-15 CORESET #0 mapping outside the BW of RedCap UE in slot n The normal UEs make BD attempts to decode Rel-15 CORESET #0 by monitoring slots n and n−1

The RedCap UEs make BD attempts to decode Rel-15 CORESET #0 by monitoring q+1 consecutive slots Similar to the example of FIG. 14, as the BW of subset #0 1506 (i.e. the part of Rel-15 CORESET #0 1502 mapping that is outside the BW of RedCap UE in slot n) does not exceed the RedCap UE BW, it is not partitioned into further subsets (i.e. q=1). The subset #0 1506 is copied & mapped within the BW of RedCap UE in slot n−1. The normal UEs make BD attempts to decode Rel-15 CORESET #0 by monitoring slot n and n−1. The RedCap UEs make BD attempts to decode Rel-15 CORESET #0 by monitoring q+1 consecutive slots (i.e. also slot n and n−1, since q=1 in this example).

Figure 16:
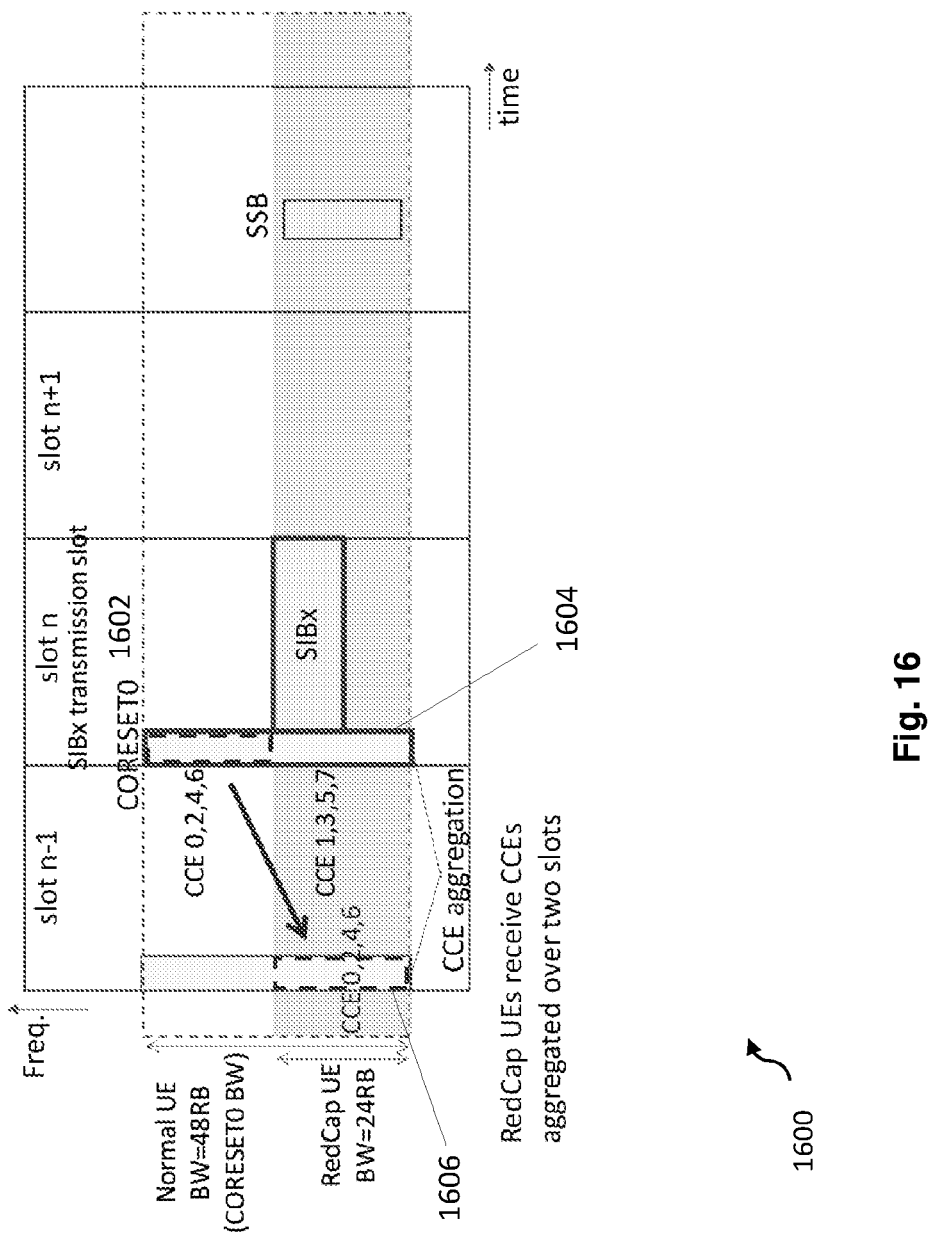
FIG. 16 shows an example of a transmission rule for how RedCap UEs receive Rel-15 CORESET #0 in accordance with a variation of embodiment 3.

FIG. 16 shows an example diagram 1600 of a transmission rule for how RedCap UEs receive Rel-15 CORESET #0 in accordance with a variation of embodiment 3. It is assumed that BW of Rel-15 CORESET #0 1602 is 48 PRBs and it has 8 CCEs. The BW of RedCap UE is 24 PRBs only. The rule shown in diagram 1600 is as follows:

The CCEs with indices of 0, 2, 4, and 6 (i.e. part 1606) for Rel-15 CORESET #0 1602 located outside of the BW of RedCap UE are copied and mapped within the BW of RedCap UE in the slot n−1 gNB only transmits CCEs with indices of 0, 2, 4, and 6 (i.e. part 1606) in slot n−1, whereas it transmits all CCEs with indices from 0 to 7 (both parts 1604 and 1606 of Rel-15 CORESET #0) for Rel-15 CORESET #0 1602 with 8 CCEs in slot n The normal UEs make BD attempts to decode Rel-15 CORESET #0 1602 in slot n−1 and slot n The RedCap UEs decode Rel-15 CORESET #0 1602 using a combination of CCEs 0, 2, 4, 6 in slot n−1 and CCEs 1, 3, 5, 7 in slot n Although CORESET #0 transmission BW is narrower than that of Rel-15 CORESET #0, the BW (i.e., $$N_{RB}^{DL,BWP})$$

used for frequency domain resource allocation of PDSCH in the DCI transmitted on the CORESET #0 may be based on Rel-15 CORESET #0 bandwidth (this is necessary because the CCEs 1, 3, 5, 7 are shared between Rel-15 UEs and RedCap UEs).

The above rule for example diagram 1600 can be extended for a scenario when the RedCap UEs are configured to monitor more than 2 consecutive slots, such as n−2, n−1, and n slots:

gNB only transmits CCEs with indices of 0, 2, 4, and 6 in slot n−2 gNB only transmits CCEs with indices of 1, 3, 5, and 7 in slot n−1 gNB transmits all CCEs with indices of 0-7 in slot n

The RedCap UEs decode Rel-15 CORESET #0 using a combination of CCEs 0, 2, 4, 6 in slot n−2 and CCEs 1, 3, 5, 7 in slot n−1

It will be appreciated that there can be other possibilities in terms of number/order of CCEs which are transmitted in a slot (such as n−2, n−1, or n) depending on the RedCap UE capability and/or gNB implementation.

Figure 17:
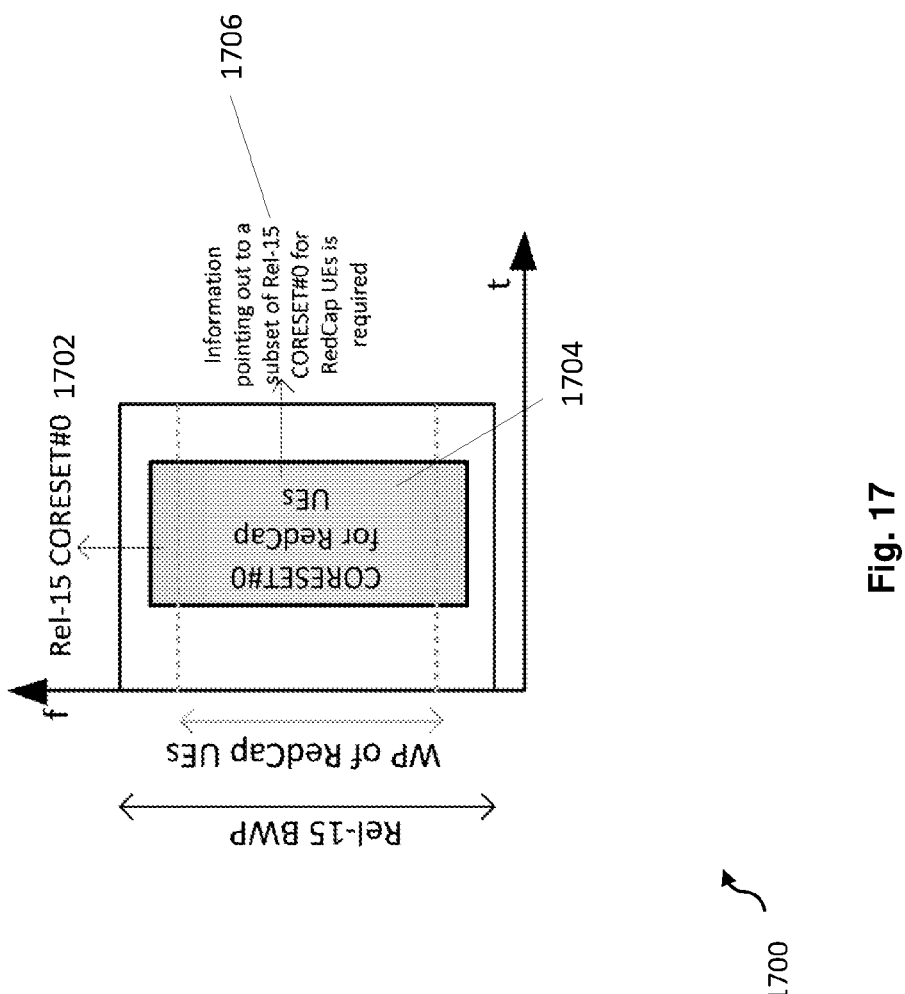
FIG. 17 shows an example of Rel-15 CORESET #0 and CORESET #0 of the RedCap UEs in accordance with an embodiment 4.

FIG. 17 shows an example diagram 1700 of Rel-15 CORESET #0 1702 and CORESET #0 1704 of the RedCap UEs in accordance with an embodiment 4. According to this embodiment, the Rel-15 CORESET #0 1702 for normal (Rel-15/16/17) UEs and information 1706 indicating to a subset of Rel-15 CORESET #0 for RedCap UEs (i.e., CORESET #0 1704 for RedCap UEs) are configured as follows:

CORESET #0 for RedCap UEs is designed based on their suitable BW, similarly shown in Embodiment 1, CORESET #0 for RedCap UEs is a subset of entries of Tables 13.1-13.10 described in TS 38.213.

Independent indications of Rel-15 CORESET #0 for normal UEs and CORESET #0 for RedCap UEs are used in embodiment 4. The physical resources of CORESET #0 for the RedCap UEs are indicated by using new entries in ControlResourceSetZero and SearchSpaceZero IEs in MIB or PDCCH-ConfigCommon. For example, additional ControlResourceSetZero NRLight and SearchSpaceZero NRLight are proposed to indicate the CORESET #0 and PDCCH monitoring occasions for RedCap UEs respectively, while the existing ControlResourceSetZero and SearchSpaceZero indicate the CORESET #0 and PDCCH monitoring occasions for the normal UEs respectively, as follows:

ControlResourceSetZero::=SEQUENCE{
    ControlResourceSetZero INTEGER (0 . . . 15)
    ControlResourceSetZero NRLight INTEGER (0 . . . 15)}
    SearchSpaceZero::=SEQUENCE{
    SearchSpaceZero INTEGER (0 . . . 15)
    SearchSpaceZero NRLight INTEGER (0 . . . 15)}

It will be appreciated that the above signalling method is also applicable to embodiments 2 and 3.

Figure 18:
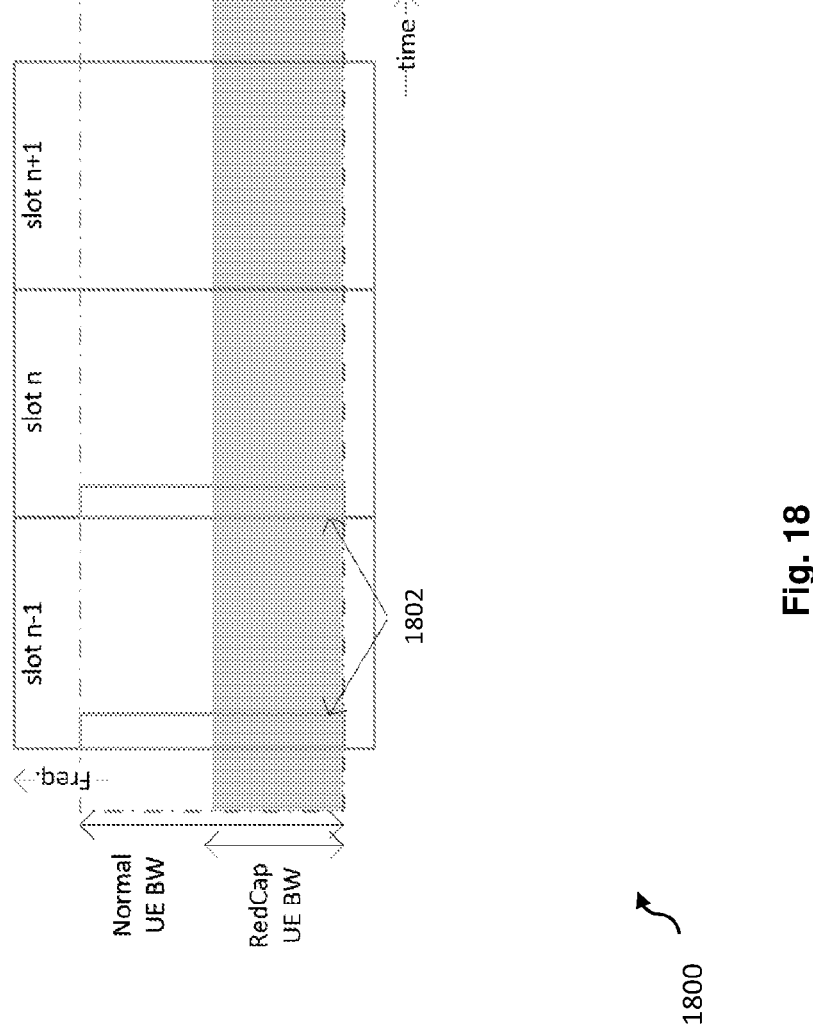
FIG. 18 shows an example of a Rel-15 CORESET #0 signalling for both normal UEs and RedCap UEs in accordance with an embodiment 5A.

According to an embodiment 5A, current indication of Rel-15 CORESET #0 (i.e., the existing ControlResourceSetZero and SearchSpaceZero IEs in MIB) is reinterpreted to use for the normal and RedCap UEs. FIG. 18 shows an example diagram 1800 of a reinterpretation of Rel-15 CORESET #0 for both normal UEs and RedCap UEs in accordance with an embodiment 5A. The same indication of Rel-15 CORESET #0 (i.e. signalling 1802) is used for normal and RedCap UE, but actual values indicated in configuration fields of CORESET #0 are different for the normal UEs and RedCap UEs. Different interpretations of configuration fields of Rel-15 CORESET #0 in ControlResourceSetZero are proposed for the RedCap UEs as follows:

New entries (rows/columns) for RedCap UEs CORESET #0 are additionally proposed in Tables 13.1-13.10 of TS 38.213

The values (physical resources) in new entries are designed based on the capability of RedCap UEs The sizes of configuration fields of Rel-15 CORESET #0 for normal UEs and CORESET #0 for RedCap UEs are the same Further, the actual values (indicated physical resources) in the entries of the proposed Tables 13.1-13.10 of 38.213 for the RedCap UEs can be different from that of the normal UEs. Normal UEs read information in current MIB and use the existing values in Tables 13.1-13.10 of 38.213 to obtain Re-15 CORESET #0 by monitoring slots n and n−1. The RedCap UEs read information in current MIB and use the corresponding values in new entries (rows and/or columns) of Table 13.1-13.10 to obtain their CORESET #0 by monitoring slots n and n−1. It will be appreciated that the above signaling method for CORESET #0 and monitoring occasions of the RedCap UEs is also applicable to the Embodiments 2 and 3. Advantageously, additional overhead due to introduction of RedCap UEs can be avoided, and there is also no impact on the MIB.

Figure 19:
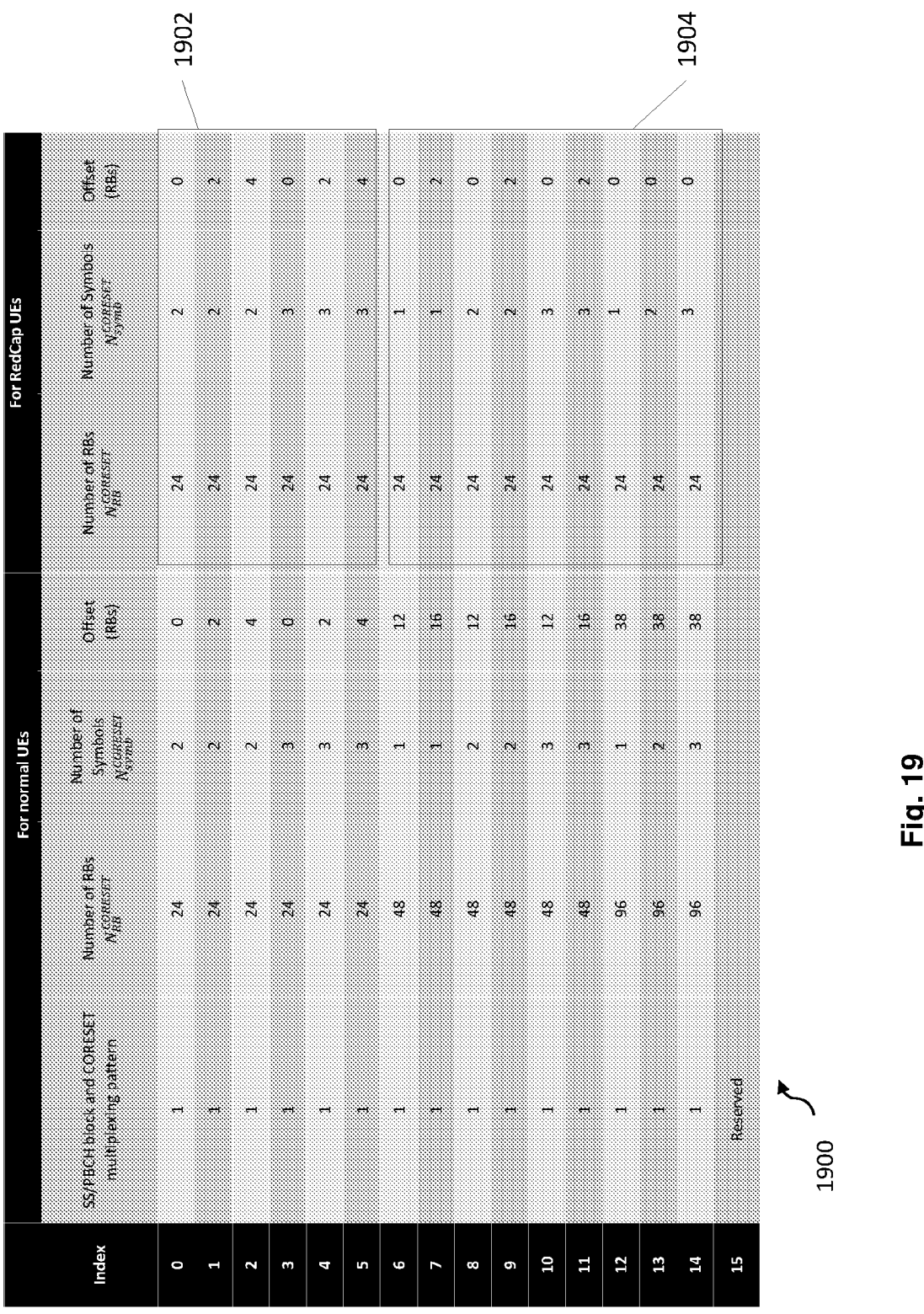
FIG. 19 shows an example of a table comprising sets of resource blocks and slot symbols of CORESET for Type0-PDCCH search space set for normal UEs and RedCap UEs, when {search space/physical broadcast channel block, PDCCH} SCS ({SS/PBCH block, PDCCH} SCS) is {15, 15} kHz for frequency bands with minimum channel bandwidth of 5 MHz or 10 MHz in accordance with an embodiment 5A.

CORESET #0 for normal UEs and RedCap UEs can be presented in the same tables as those of TS 38.213 or in independent tables. FIG. 19 shows an example of CORESET #0 being presented in the same table as that of Table 13.1 of TS 38.213. Table 1900 of FIG. 19 comprises sets of resource blocks and slot symbols of CORESET for Type0-PDCCH search space set for normal UEs and RedCap UEs, when {search space/physical broadcast channel block, PDCCH} SCS ({SS/PBCH block, PDCCH} SCS) is {15, 15} kHz for frequency bands with minimum channel bandwidth of 5 MHz or 10 MHz in accordance with embodiment 5A. When BW of RedCap UEs is 5 MHz, {SSB, PDCCH} SCS is {15, 15} kHz, based on Table 13.1 of TS 38.213, an example of new rows and columns for RedCap UEs CORESET #0 are added as shown in Table 1900. For indices 0-5, the values of entries shown in table portion 1902 with $$N_{RB}^{CORESET}$$

of 24 PRBs are same for normal and RedCap UEs, i.e., legacy values. For indices 6-15, the values of remaining entries shown in table portion 1904 for RedCap UEs are different from that of the normal UEs. It will be appreciated that this approach can be used to define new rows and columns in Table 13.2-13.10 as well for the RedCap UEs.

FIG. 20 shows an example of CORESET #0 being presented in an independent table from that of Table 13.1 of TS 38.213. Table 2000 of FIG. 20 comprises sets of resource blocks and slot symbols of CORESET for Type0-PDCCH search space set for RedCap UEs, when {SS/PBCH block, PDCCH} SCS is {15, 15} kHz for frequency bands with minimum channel bandwidth of 5 MHz in accordance with embodiment 5A. In this independent table arrangement, current Table 13.1 of TS 38.213 is used to present Rel-15 CORESET #0 for the normal UEs, while independent table 2000 (which is based on table 1900) is used to present CORESET #0 for the RedCap UEs. For different scenarios shown in Tables 13.2-13.10 of TS 38.213, it will be appreciated that a similar above approach can be applied to define the corresponding independent tables for the RedCap UEs.

Figure 21:
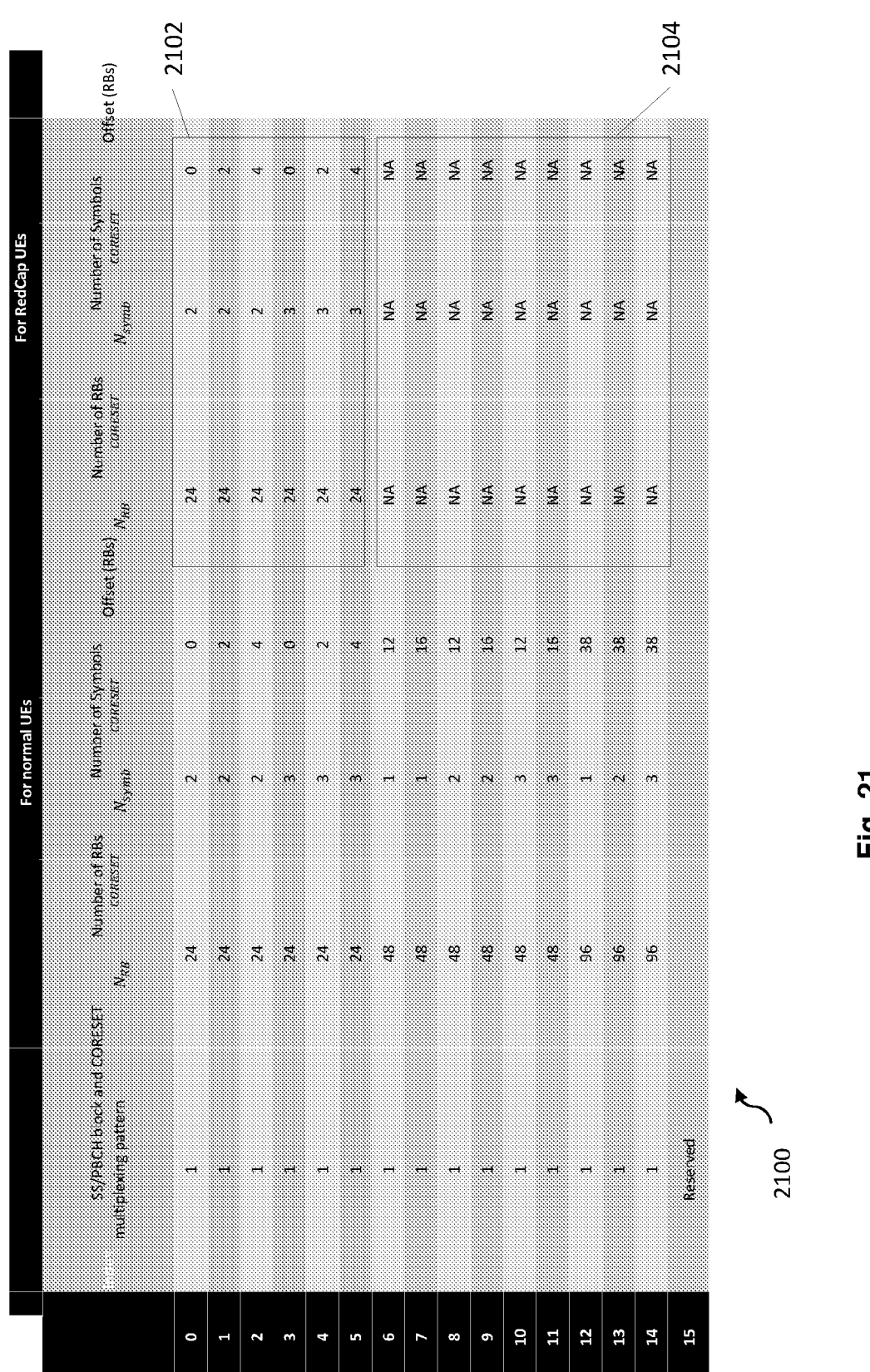
FIG. 21 shows an example of a table comprising sets of resource blocks and slot symbols of CORESET for Type0-PDCCH search space set for normal UEs and RedCap UEs, when {SS/PBCH block, PDCCH} SCS is {15, 15} kHz for frequency bands with minimum channel bandwidth of 5 MHz or 10 MHz in accordance with a variation of embodiment 5A.

FIG. 21 shows an example of a table 2100 comprising sets of resource blocks and slot symbols of CORESET for Type0-PDCCH search space set for normal UEs and RedCap UEs, when {SS/PBCH block, PDCCH} SCS is {15, 15} kHz for frequency bands with minimum channel bandwidth of 5 MHz or 10 MHz in accordance with a variation of embodiment 5A. In this variation, A different interpretation of Table 13.1 in TS 38.213 for defining RedCap UEs CORESET #0 is shown in table 2100. When the BW of RedCap UEs is 5 MHz, {SSB, PDCCH} SCS is {15, 15} kHz, based on Table 13.1 of TS 38.213, an example of new rows and columns for RedCap UEs CORESET #0 are added as shown in Table 2100. For indices 0-5, the values of entries shown in table portion 2102 with $$N_{RB}^{CORESET}$$

of 24 PRBs are same for normal and RedCap UEs. For indices 6-15, the values of remaining entries shown in table portion 2104 are not applicable (NA) or reserved. It will be appreciated that a similar approach can be used to define new entries in rows and columns of Table 13.2-13.10 for the RedCap UEs.

In an embodiment 5B, current indication of Rel-15 CORESET #0 (i.e., the existing ControlResourceSetZero and SearchSpaceZero IEs in MIB) is reinterpreted to use for the normal and RedCap UEs. Different interpretations of configuration fields of Rel-15 CORESET #0 are proposed for the RedCap UEs, as follow:

New entries (rows/columns) for RedCap UEs CORESET #0 are additionally proposed in Tables 13.1-13.10 of TS 38.213

The values (physical resources) in new entries are designed based on the capability of RedCap UEs These values can be a subset of entries of the Rel-15 CORESET #0

Figure 22:
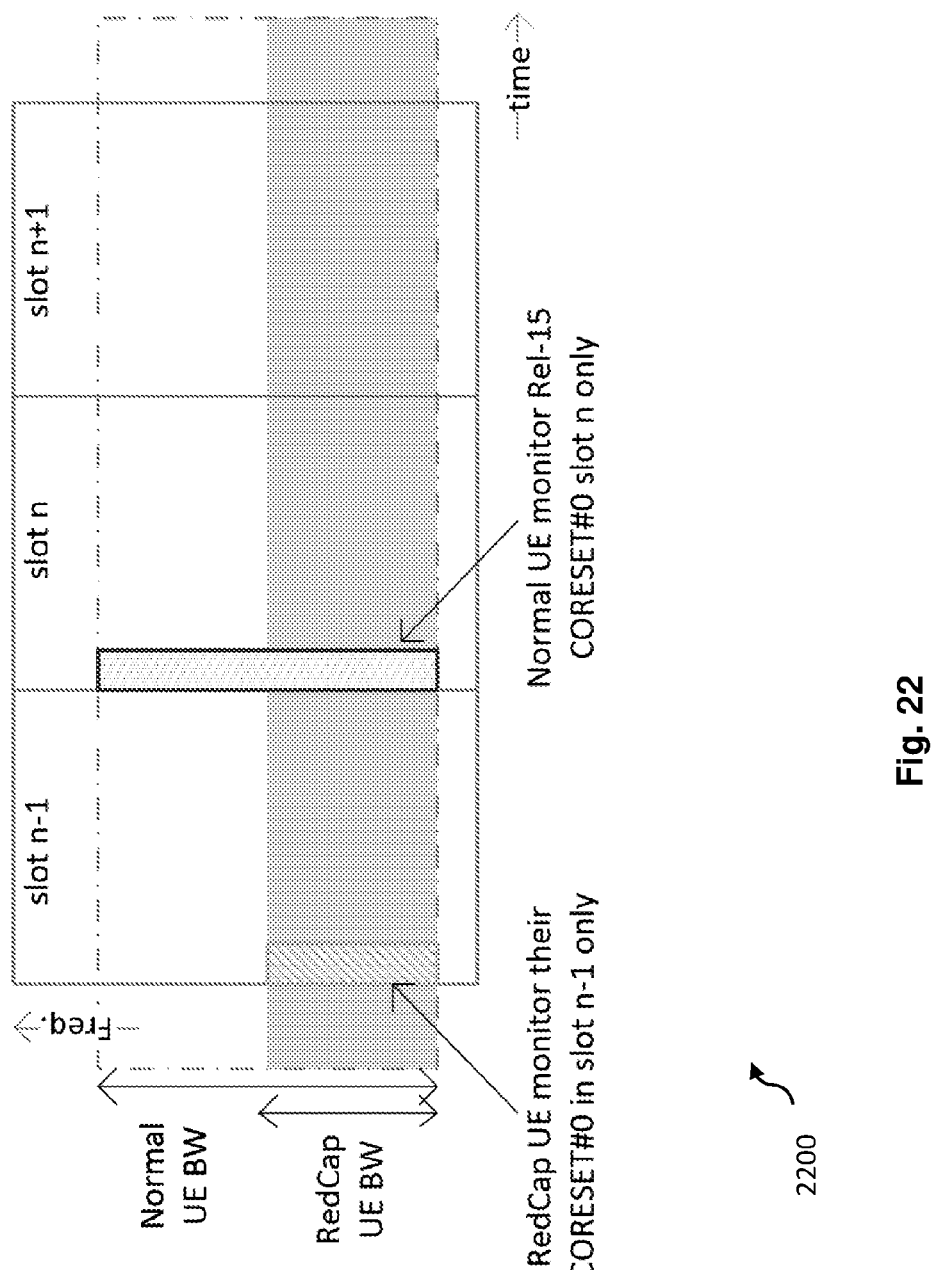
FIG. 22 shows an example of reinterpretation of Rel-15 CORESET #0 monitoring occasions for normal UEs and RedCap UEs in accordance with an embodiment 5B.

The sizes of configuration fields of Rel-15 CORESET #0 for normal UEs and CORESET #0 for RedCap UEs are different Furthermore, different monitoring occasions in SearchSpaceZero are proposed for the normal UEs and RedCap UEs. FIG. 22 shows an example diagram 2200 of reinterpretation of Rel-15 CORESET #0 monitoring occasions for normal UEs and RedCap UEs in accordance with embodiment 5B. gNB only transmits Rel-15 CORESET #0 in slot n, while it only transmits CORESET #0 for RedCap UEs in slot n−1. Normal UEs read information in current MIB and use their existing values to make BD attempts to decode Rel-15 CORESET #0 by only monitoring slot n as shown in FIG. 22. On the other hand, the RedCap UEs read information in current MIB and use the corresponding values in new entries to make BD attempts to decode their CORESET #0 by monitoring a slot such as n−1 as shown in FIG. 22. This advantageously reduces the monitoring occasions of all UEs for power saving. It will be appreciated that the size of new entries and monitoring occasions for RedCap UEs in embodiments 5A and 5B can be different.

According to embodiment 5B, CORESET #0 for RedCap UEs can be defined using the method as shown in tables 2000 and 2200 i.e. defining CORESET #0 for RedCap UEs based on their BW capability. The monitoring occasions are given in SearchSpaceZero and the parameters are defined in Tables 13.11-13.15 in TS 38.213. Accordingly, reinterpretation of Rel-15 CORESET #0 Monitoring Occasions is based on the Tables 13.11-13.15. FIG. 23 shows a table 2300 of parameters for reinterpretation of PDCCH monitoring occasions for Type0-PDCCH CSS set—SSB and CORESET multiplexing pattern 1 and frequency range 1 (FR1), in accordance with embodiment 5B. A new column 2302 is added to indicate in which slot (index p) RedCap UEs CORESET #0 is mapped as shown in table 2300. If p=0, monitoring occasion for RedCap UEs CORESET #0 is slot n−1, where slot n is monitoring occasion for Rel.15 CORESET #0. If p=1, monitoring occasion for RedCap UEs CORESET #0 is slot n+1, where slot n is monitoring occasion for Rel.15 CORESET #0.

Figure 24:
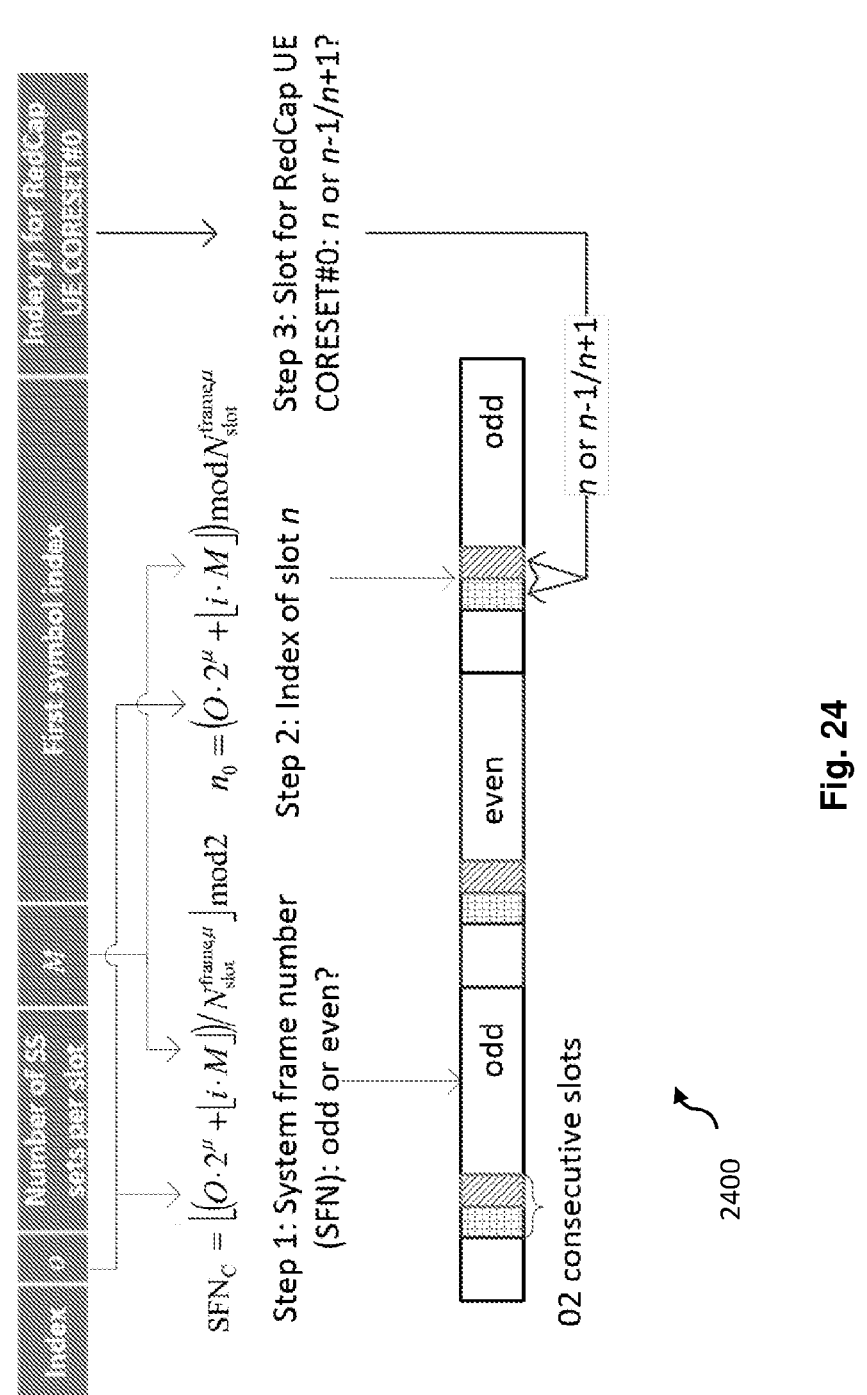
FIG. 24 illustrates an example of details for reading the table of FIG. 23.

FIG. 24 illustrates an example of detailed steps for reading the table 2300 of FIG. 23

Step 1: Define odd or even system frame number (SFN)

Step 2: Define the index of slot n

Figure 25:
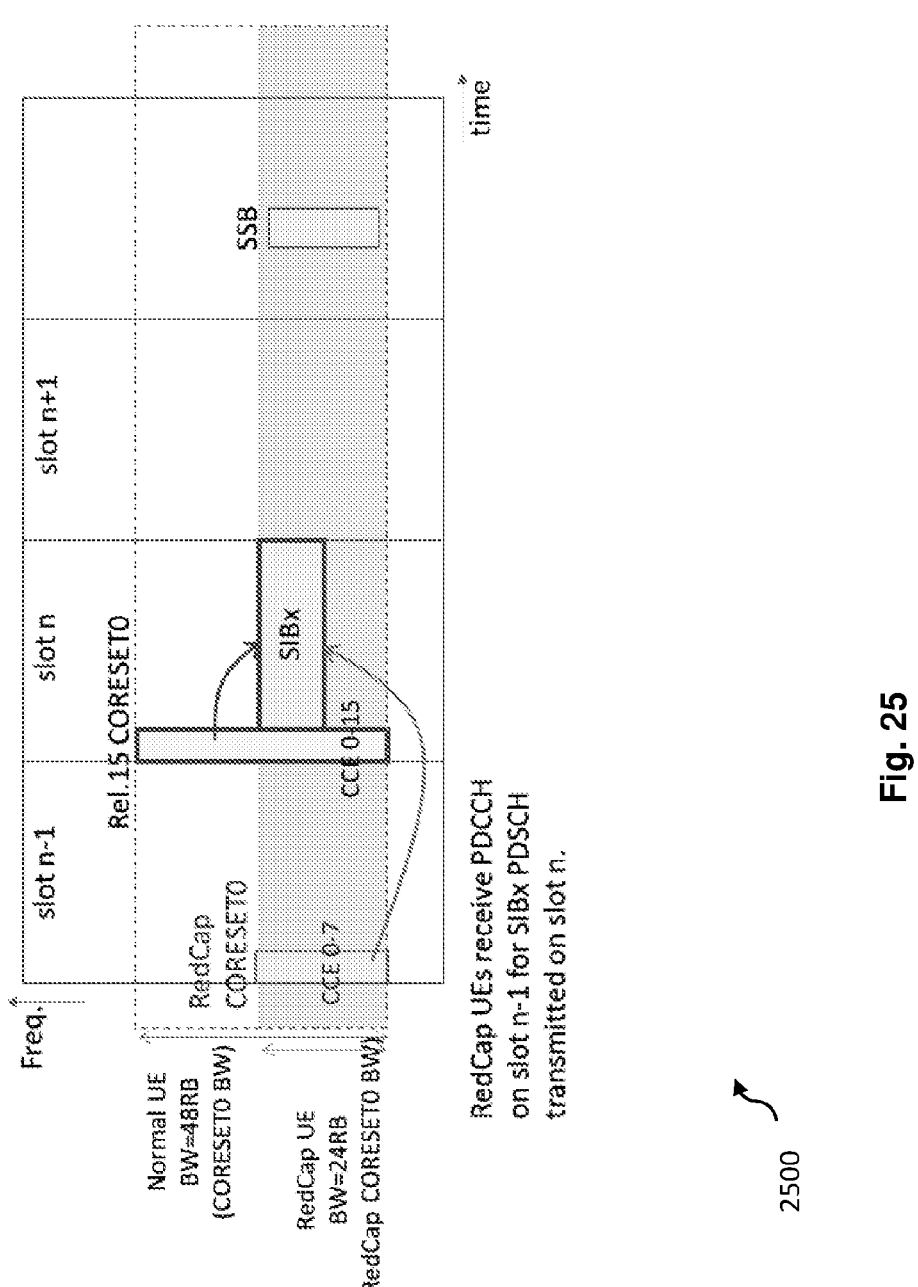
FIG. 25 shows an illustration of different monitoring occasions of Re-15 CORESET #0 for normal UEs and CORESET #0 for RedCap UEs in accordance with an embodiment 5B.

Step 3: Based on value of p, which slot for mapping RedCap UEs CORESET #0 is defined FIG. 25 shows an illustration 2500 of different monitoring occasions of Re-15 CORESET #0 for normal UEs and CORESET #0 for RedCap UEs in accordance with embodiment 5B. It is assumed that Rel-15 CORESET #0 is 48 PRBs and CORESET #0 for RedCap UEs is 24 PRBs. Detail monitoring occasions are shown in FIG. 25 as follows:

gNB only transmits Rel-15 CORESET #0 of 48 PRBs, which is shown in Table 2100, for normal UEs in slot n.

gNB only transmits CORESET #0 of 24 PRBs, which is shown in Table 2100, for the RedCap UEs in slot n−1

Normal UEs read information in current MIB and make BD attempts to decode Rel-15 CORESET #0 by only monitoring slot n RedCap UEs read information in current MIB and make BD attempts to decode Rel-15 CORESET #0 by monitoring slot n−1 or n+1

It will be appreciated that Rel-15 CORESET #0 for normal UEs and CORESET #0 for the RedCap UEs could be used to schedule to the same or different system information blocks (SIBs) PDSCHs, also known as SIBx (SIB with index x).

According to an embodiment 5C, current indication of Rel-15 CORESET #0 (i.e., the existing ControlResourceSetZero and SearchSpaceZero IEs in MIB) is reinterpreted to use for both normal and RedCap UEs. Different interpretations of configuration fields of Rel-15 CORESET #0 are also proposed for the RedCap UEs, such that new entries (rows/columns) for RedCap UEs CORESET #0 are additionally proposed in Tables 13.1-13.10 of TS 38.213, wherein the values (physical resources) in new entries are designed based on the capability of RedCap UEs. These values can be defined by using similar approach as shown in examples for embodiments 5A or 5B (Tables 1900, 2100 or 2300).

Furthermore, repetition for CORESET #0 can be signalled explicitly and/or signalled implicitly to the RedCap UEs. In an implicit approach, signalling can be via (pre-) configured rules. In an explicit approach, signalling can be via higher layer signalling. For example, additional columns are added in Table 13.1 or Table 13.11 of TS 38.213 to indicate the repetition for RedCap UEs in ControlResourceSetZero or SearchSpaceZero given in Table 2600 of FIG. 26 or Table 2700 of FIG. 27 respectively. On a time domain location of repetition, CORESET #0 for SSBy is used as a repetition of CORESET #0 for SSBx. Within the same beam, gNB transmits Rel-15 CORESET #0 for normal UEs specified in SSBx, while it transmits CORESET #0 for RedCap UEs specified in SSBx and SSBy (as repetition). Accordingly, the normal UEs detect SSBx to get Rel-15 CORESET #0, and the RedCap UEs detect SSBx and SSBy to get their CORESET #0. Advantageously, coverage of common channels can be reduced due to a potential BW reduction of the RedCap UEs. This solution can improve the coverage performance for the RedCap UEs.

Referring to table 2600 of FIG. 26, based on Table 13.1 of TS 38.213, additional columns 2602 are added in to indicate new entries for RedCap UEs CORESET #0 and the number of repetition in ControlResourceSetZero. Table 2600 can be split into independent tables for normal UEs and RedCap UEs as similarly shown in table 2000. It will be appreciated that this is only an example and there can be other possibilities in terms of number of rows/columns and values in these rows/columns which can be additionally configured in Tables 13.1-13.10, defined based on the capability of RedCap UEs.

Referring to table 2700 of FIG. 27, based on Table 13.11 of TS 38.213, an additional column 2702 is added in to indicate the number of repetition in SearchSpaceZero. It will be appreciated that this is only an example and there can be other possibilities in terms of values in these rows/columns which can be additionally configured in Tables 13.1-13.15, defined based on the capability of RedCap UEs.

According to the network availability and capability of the RedCap UEs, the multiple embodiments can be applied together in the network for the RedCap UEs. CORESET #0 for the RedCap UEs shown in the embodiments 1-5 can be pre-configured via an application layer. Regarding the embodiments 2, 3, 4, 5A, 5B, and 5C, current cell(s) (Pcell/PSCell/Scell) with only Rel-15/16 capability cannot support RedCap UEs. For example, a message such as "this cell does not support RedCap UE" requires to be signalled in MIB or SIB1, or a new physical-layer cell identity (PCID) range is used for the RedCap UEs, so they can discard these cells.

The RedCap UEs are proposed to support a BW that is at least equal to the maximum BW of CORESET #0 defined in Rel-15/16 (i.e., the BW of RedCap is equal to or greater than the maximum BW of CORESET #0 defined in Rel-15/16). Current Rel-15 CORESET #0 is reused or shared for the RedCap UEs (i.e., the normal Rel-15/16/17 UEs and Red-Cap UEs are configured with the current Rel-15 CORESET #0). Physical resources of CORESET #0 are defined based on the minimum bandwidth configuration associated with one or more UEs in the set of normal (non-RedCap or Rel-15/16/17 . . . ) UEs and RedCap UEs. The UEs perform blind decoding on PDCCH candidates in a search space carried by the CORESET #0 to achieve all control information over one or more consecutive slots depending on the CORESET #0 bandwidth, physical resource mapping schemes, or monitoring occasions.

When the RedCap UE bandwidth is equal to or greater than the CORESET #0 bandwidth in both frequency range 1 (FR1) and frequency range 2 (FR2), both SSB and CORESET #0 can be shared between RedCap UEs and non-RedCap UEs. Moreover, if the network wants to offload the transmissions for RedCap UEs, it can configure a separated CORESET #0 or initial downlink bandwidth part (BWP), which is frequency-division m multiplexed (FDMed) with the non-RedCap UEs. For example, SSB and CORESET #0 can be frequency domain multiplexed for multiplexing patterns 2 and 3 in FR2. In some specific cases, the total bandwidth can span more than the maximum bandwidth of RedCap UE. This may require frequency retuning and sequential acquisition of SSB and CORESET #0 which may result in an additional latency. Nevertheless, such additional latency is acceptable for RedCap use cases. Therefore, there might not need to enhance acquisitions for SSB and/or CORESET #0.

FIG. 28 shows a flow diagram 2800 illustrating a communication method according to various embodiments. In step 2802, a CORESET #0 of which time and frequency resources are defined based on a minimum bandwidth configuration associated with one or more UEs in a set of normal (non-RedCap) UEs and RedCap UE is received, and a system information block type 1 (SIB1) physical downlink shared channel (PDSCH) which is scheduled based on the CORESET #0 is also received. In step 2804, control information and parameters from the PDCCH on CORESET #0 to read the SIB1, Msg2 PDSCH, and Msg4 PDSCH for initial access, handover, or beam failure recovery are determined.

Figure 29:
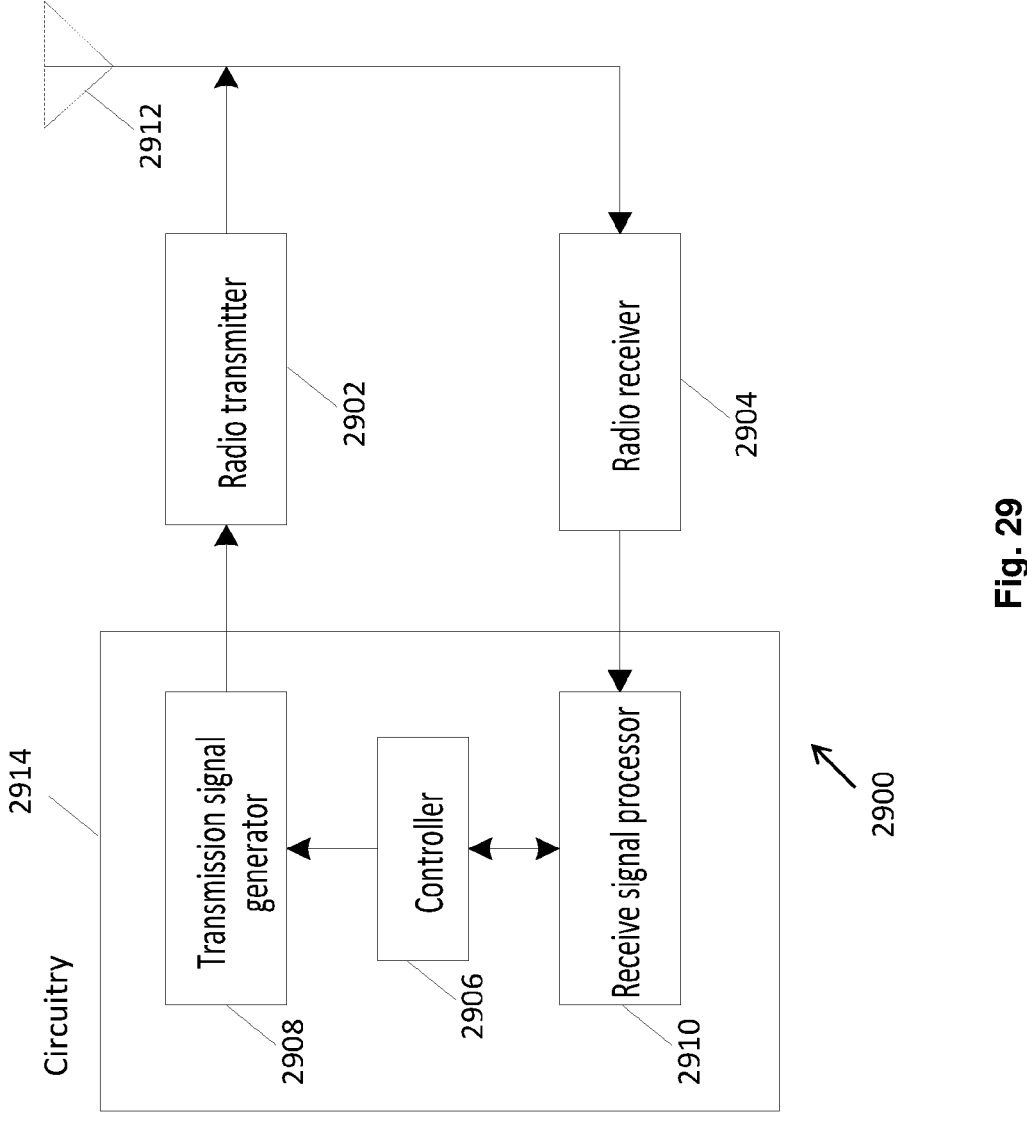
FIG. 29 shows a schematic example of a communication apparatus that can be used for implementation of CORESET #0 for RedCap UEs in accordance with various embodiments.

FIG. 29 shows a schematic, partially sectioned view of the communication apparatus 2900 that can be implemented for facilitating implementation of CORESET #0 for RedCap devices in accordance with the various embodiments. The communication apparatus 2900 may be implemented as a gNB, normal UE or RedCap UE according to various embodiments.

Various functions and operations of the communication apparatus 2900 are arranged into layers in accordance with a hierarchical model. In the model, lower layers report to higher layers and receive instructions therefrom in accordance with 3GPP specifications. For the sake of simplicity, details of the hierarchical model are not discussed in the present disclosure.

As shown in FIG. 29, the communication apparatus 2900 may include circuitry 2914, at least one radio transmitter 2902, at least one radio receiver 2904 and multiple antennas 2912 (for the sake of simplicity, only one antenna is depicted in FIG. 29 for illustration purposes). The circuitry 2914 may include at least one controller 2906 for use in software and hardware aided execution of tasks it is designed to perform, including control of communications with one or more other communication apparatuses in a MIMO wireless network. The at least one controller 2906 may control at least one transmission signal generator 2908 for generating SIB, SL-UEInfo and/or RRC-Reconfig messages to be sent through the at least one radio transmitter 2902 to one or more other communication apparatuses and at least one receive signal processor 2910 for processing said SIB, SL-UEInfo and/or RRC-Reconfig messages received through the at least one radio receiver 2904 from the one or more other communication apparatuses. The at least one transmission signal generator 2908 and the at least one receive signal processor 2910 may be stand-alone modules of the communication apparatus 2900 that communicate with the at least one controller 2906 for the above-mentioned functions, as shown in FIG. 29. Alternatively, the at least one transmission signal generator 2908 and the at least one receive signal processor 2910 may be included in the at least one controller 2906. It is appreciable to those skilled in the art that the arrangement of these functional modules is flexible and may vary depending on the practical needs and/or requirements. The data processing, storage and other relevant control apparatus can be provided on an appropriate circuit board and/or in chipsets. In various embodiments, when in operation, the at least one radio transmitter 2902, at least one radio receiver 2904, and at least one antenna 2912 may be controlled by the at least one controller 2906.

In the embodiment shown in FIG. 29, the at least one radio receiver 2904, together with the at least one receive signal processor 2910, forms a receiver of the communication apparatus 2900. The receiver of the communication apparatus 2900, when in operation, provides functions required for facilitating implementation of CORESET #0 for RedCap devices.

The communication apparatus 2900, when in operation, provides functions required for facilitating implementation of CORESET #0 for RedCap devices. For example, the communication apparatus 2900 may be a communication apparatus, and the receiver 2904 may, in operation, receive a physical downlink control channel (PDCCH) on a control resource set zero (CORESET #0) of which time and frequency resources are defined based on a bandwidth configuration of reduced capacity user equipments (RedCap UEs), and receive a system information block type 1 (SIB1) physical downlink shared channel (PDSCH) which is scheduled based on the CORESET #0. The circuitry 2914 may, in operation, determine control information and parameters from the PDCCH on CORESET #0 to read SIB1 for initial access, handover, or beam failure recovery.

The circuitry 2914 may be further configured to discard or ignore discard or ignore control information on the CORESET #0 if the CORESET #0 has a larger bandwidth than that of the communication apparatus 2900.

The CORESET #0 for the RedCap UEs can be a subset of entries of Tables 13.1-13.10 in TS 38.213 or a subset of physical resources such as control channel elements (CCEs) or physical resource blocks (PRBs) of Rel-15 CORESET #0.

The CORESET #0 may be a subset of a Rel-15 CORESET #0, such that only the subset is available to configure for all types of UEs including normal (non-RedCap) UEs and RedCap UEs in an associated network.

The CORESET #0 may be a Rel-15 CORESET #0 that is partitioned into m equal or unequal subsets such that m 1, each subset having a bandwidth that is lesser than that of the RedCap UE. Each subset may correspond to a subset of entries of Tables 13.1-13.10 in TS 38.213 or a subset of physical resources such as control channel elements (CCEs) or physical resource blocks (PRBs) of Rel-15 CORESET #0. Each subset may be mapped to each of m consecutive slots. An upper limit for m may be dependent on UE capability, consideration of channel delay/estimation, or periodicity of SSB. The subsets may be mapped to m consecutive slots such that an ith subset of the subsets is mapped in a corresponding slot n−i, where $0\leq i<m$, wherein slot n can be a PDCCH monitoring occasion (slot or symbol) for Rel.15 CORESET #0 or a PDCCH monitoring occasion configured for RedCap UE. An upper limit for m may be dependent on UE capability, consideration of channel delay/estimation, or periodicity of SSB, The CORESET #0 may be a Rel-15 CORESET #0 that is partitioned into m equal or unequal subsets such that $m\geq 1$, each subset having a bandwidth that is lesser than that of the RedCap UE; wherein the Rel-15 CORESET #0 is mapped in a first slot; and wherein each subset is mapped to each slot of m−1 consecutive slots different from the first slot. An upper limit for m may be dependent on UE capability, consideration of channel delay/estimation, or periodicity of SSB, The CORESET #0 may be a Rel-15 CORESET #0 that is partitioned into m equal or unequal subsets such that $\geq 1$, each subset having a bandwidth that is lesser than that of the RedCap UE; wherein the Rel-15 CORESET #0 is mapped in a slot n; and wherein an ith subset is mapped to a corresponding slot k−i such that k is a predefined value and $0\leq i<m$. An upper limit for m may be dependent on UE capability, consideration of channel delay/estimation, or periodicity of SSB.

The CORESET #0 may be a Rel-15 CORESET #0, wherein part of the Rel-15 CORESET #0 that is outside of the RedCap UE bandwidth is partitioned into q equal or unequal subset(s) such that $q\geq 1$, each subset having a bandwidth that is lesser than that of the RedCap UE; wherein the Rel-15 CORESET #0 is mapped in a first slot; wherein each subset of the q equal or unequal subset(s) is copied and mapped within the RedCap UE bandwidth in each slot of q consecutive slots different from the first slot. An upper limit for q may be dependent on UE capability, consideration of channel delay/estimation, or periodicity of SSB.

The CORESET #0 may be a Rel-15 CORESET #0, wherein part of the Rel-15 CORESET #0 that is outside of the RedCap UE bandwidth is partitioned into q equal or unequal subset(s) such that $q\geq 1$, each subset having a bandwidth that is lesser than that of the RedCap UE; wherein the Rel-15 CORESET #0 is mapped in a first slot; wherein at each slot of q consecutive slots different from the first slot, only the part of CORESET #0 mapping inside of the BW, and where the RedCap UE can monitor, is replaced by an subset of the q equal or unequal subset(s) of the CORESET #0. An upper limit for q may be dependent on UE capability, consideration of channel delay/estimation, or periodicity of SSB.

Information indicating Rel-15 CORESET #0 and PDCCH monitoring occasions for normal UEs may be used to present the CORESET #0 for RedCap UEs, the information comprising existing entries in ControlResourceSetZero and SearchSpaceZero IEs in MIB.

Information indicating Rel-15 CORESET #0 and PDCCH monitoring occasions for normal (non-RedCap) UEs, and information indicating CORESET #0 and PDCCH monitoring occasions for RedCap UEs, may be configured to be independent from each other, wherein the receiver 2904 is configured to receive both information, and wherein the circuitry 2914 is configured to determine control information and parameters to read the SIB1 based on the indicated information for normal UEs if the communication apparatus is the normal UE, or based on the indicated information for RedCapUEs if the communication apparatus is the RedCap UE.

Information indicating Rel-15 CORESET #0 for normal (non-RedCap) UEs may be configured to be interpreted differently for RedCap UEs, such that the information indicates the physical resources of CORESET #0 for RedCap UEs that can be the same or different from that of normal UEs, wherein the receiver 2904 is configured to receive the information; and wherein, based on the information, the circuitry 2914 is configured to obtain control information and parameters to read the SIB1 from the Rel-15 CORESET #0 for normal UEs if the communication apparatus is the normal UE or from the CORESET #0 for RedCap UEs if the communication apparatus is the RedCap UE.

Information indicating Rel-15 CORESET #0 for normal (non-RedCap) UEs may be configured to be interpreted differently for RedCap UEs, such that the information indicates the physical resources of CORESET #0 for RedCap UEs that can be different from that of normal UEs and indicates monitoring occasions for RedCap UEs that are different from that of normal UEs, wherein the receiver 2904 is configured to receive the information; and wherein, based on the information, the circuitry 2914 is configured to obtain control information and parameters to read the SIB1 from the Rel-15 CORESET #0 for normal UEs if the communication apparatus is the normal UE or from the CORESET #0 for RedCap UEs the communication apparatus is the RedCap UE in the corresponding monitoring occasions.

Information indicative of Rel-15 CORESET #0 for normal (non-RedCap) UEs may be configured to be interpreted differently for RedCap UEs, such that the information indicates physical resources of RedCap UE CORESET #0 that can be different from that of normal UEs and indicates one or more repetitions of for CORESET #0, wherein the one or more repetitions can be signalled implicitly via (pre-)configured rules or explicitly via higher layer signalling to the RedCap UEs, wherein the receiver is configured to receive the information, and wherein, based on the information, the circuitry 2914 is configured to obtain control information and parameters to read the SIB1 from the Rel-15 CORESET #0 for normal UEs if the communication apparatus is the normal UE or from the CORESET #0 for RedCap UEs the communication apparatus is the RedCap UE.

Within a same beam, an associated gNB may be configured to transmit the Rel-15 CORESET #0 for normal UEs specified in SSBx and CORESET #0 for RedCap UEs specified in SSB with index x and SSB with index y, wherein the CORESET #0 specified in SSB with index y being a repetition of the CORESET #0 in SSB with index x, such that normal UEs detect SSBx to obtain the Rel-CORESET #0 and RedCap UEs detect SSB with index x and SSB with index y to obtain the CORESET #0 for RedCap UEs, wherein the one or more repetitions is signalled implicitly via (pre-)configured rules or explicitly via higher layer signalling.

CORESET #0 for RedCap UEs may be pre-configured by an application layer. Serving cell(s) (Pcell/PSCell/Scell) with only Rel-15/16 capability may not support RedCap UEs, a message such as "this cell does not support RedCap UE" may be required to be signalled in MIB/SIB1, or a new physical-layer cell identity (PCID) range may be used for the RedCap UEs, such that the communication apparatus 2900 can discard or ignore these cells if the communication apparatus is the RedCap UE. The RedCap UEs may support a bandwidth that is at least equal to a maximum bandwidth of CORESET #0 defined in Rel-15/16, wherein Rel-15 CORESET #0 may be used to configure for all type of non-RedCap and RedCap UEs. Physical resources of CORESET #0 may be defined based on a minimum bandwidth configuration associated with one or more UEs in a set of normal (non-RedCap) UEs and RedCap UEs in a serving cell, wherein the UEs are configured to perform blind decoding on PDCCH candidates in a search space carried by the CORESET #0 to achieve all control information over one or more consecutive slots depending on the CORESET #0 bandwidth, physical resource mapping schemes, or monitoring occasions.

The communication apparatus 2900, when in operation, provides functions required for facilitating implementation of CORESET #0 for RedCap devices. For example, the communication apparatus 2900 may be a base station or gNB, and the circuitry 2914 may, in operation, configure a control resource set zero (CORESET #0) of which time and frequency resources are defined based on a minimum bandwidth configuration associated with one or more UEs in a set of normal (non-RedCap) UEs and the RedCap UEs, generate a physical downlink control channel (PDCCH) on the CORESET #0, and schedule a system information block type 1 (SIB1) physical downlink shared channel (PDSCH) based on the CORESET #0; and the transmitter 2902 may, in operation, transmit the PDCCH on CORESET #0 and the SIB1 PDSCH to a communication apparatus.

As described above, the embodiments of the present disclosure provides advanced communication methods and communication apparatuses that enables implementation of CORESET #0 for RedCap devices.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred as a communication apparatus.

The communication apparatus may comprise a transceiver and processing/control circuitry. The transceiver may comprise and/or function as a receiver and a transmitter. The transceiver, as the transmitter and receiver, may include an RF (radio frequency) module including amplifiers, RF modulators/demodulators and the like, and one or more antennas.

Some non-limiting examples of such communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

It will be appreciated by a person skilled in the art that numerous variations and/or modifications may be made to the present disclosure as shown in the specific embodiments without departing from the spirit or scope of the disclosure as broadly described. The present embodiments are, therefore, to be considered in all respects illustrative and not restrictive.

The invention claimed is:

1. A communication apparatus, comprising:
a receiver, which in operation, receives a physical downlink control channel (PDCCH) on a control resource set zero (CORESET #0) of which time and frequency resources are defined based on a bandwidth configuration of reduced capacity user equipment (RedCap UE), and receives a system information block type 1 (SIB1)

physical downlink shared channel (PDSCH) which is
scheduled based on the CORESET #0; and circuitry, which in operation, determines control informa-
tion and parameters-from the PDCCH on CORESET
0 to read SIB1, wherein, the RedCap UE supports a first bandwidth, which is used
for configuring both non-RedCap UE and the RedCap
UE, and is equal to or greater than a maximum band-
width of the CORESET #0.

2. The communication apparatus according to claim 1,
wherein the CORESET #0 for the RedCap UE is defined
according to a table in clause 13 of TS 38.213.

3. The communication apparatus according to claim 1,
wherein the CORESET #0 is a Rel-15 CORESET #0 that is
partitioned into m equal or unequal subsets, m being greater
1.

4. The communication apparatus according to claim 1,
wherein information indicating Rel-15 CORESET #0 and
PDCCH monitoring occasions for the non-RedCap UE is
used to present the CORESET #0 for the RedCap UE, the
information comprising entries in ControlResourceSetZero
and SearchSpaceZero IEs in a master information block
(MIB).

5. The communication apparatus according to claim 1,
wherein the circuitry is configured to read the SIB1 from a
Rel-15 CORESET #0 for the non-RedCap UE if the com-
munication apparatus is the non-RedCap UE or from the
CORESET #0 for the RedCap UE if the communication
apparatus is the RedCap UE.

6. The communication apparatus according to claim 1,
wherein the RedCap UE supports a second bandwidth,
which is used for configuring the RedCap UE, and is smaller
than the maximum bandwidth of the CORESET #0.

7. The communication apparatus according to claim 6,
wherein when the second bandwidth is supported, the frequency
resources comprise at least one of a second number of
physical resource blocks (PRBs) and a third number of
PRBs, which are obtained by unevenly dividing a first
number of PRBs indicated by a table, and the second number of PRBs and the third number of PRBs
are smaller than the second bandwidth.

8. The communication apparatus according to claim 1,
wherein the CORESET #0 for the RedCap UE comprises
two or three consecutive orthogonal frequency division
multiplexing (OFDM) symbols.

9. The communication apparatus according to claim 1,
wherein the maximum bandwidth of the CORESET #0 is
defined as a number of consecutive physical resource blocks
(PRBs).

10. A base station, comprising:

circuitry, which in operation, configures a control
resource set zero (CORESET #0) of which time and
frequency resources are defined based on a bandwidth
configuration of reduced capacity user equipment
(RedCap UE), generates a physical downlink control
channel (PDCCH) on the CORESET #0, and schedules
a system information block type 1 (SIB1) physical
downlink shared channel (PDSCH) based on the
CORESET #0; and a transmitter, which in operation, transmits the PDCCH
on CORESET #0 and the SIB1 PDSCH to a commu-
nication apparatus, wherein, the RedCap UE supports a first bandwidth, which is used
for configuring both non-RedCap UE and the RedCap
UE, and is equal to or greater than a maximum band-
width of the CORESET #0.

11. A communication method, comprising:

receiving a CORESET #0 of which time and frequency
resources are defined based on a minimum-bandwidth
configuration of reduced capacity user equipment
(RedCap UE), receiving a system information block type 1 (SIB1)
physical downlink shared channel (PDSCH) which is
scheduled based on the CORESET #0; and determining control information from the PDCCH on
CORESET #0 to read the SIB1, wherein, the RedCap UE supports a first bandwidth, which is used
for configuring both non-RedCap UE and the RedCap
UE, and is equal to or greater than a maximum band-
width of the CORESET #0.

* * * * *